United States Patent
Wang et al.

(10) Patent No.: US 11,321,280 B2
(45) Date of Patent: May 3, 2022

(54) MULTIMEDIA FILE SHARING METHOD AND TERMINAL DEVICE

(71) Applicant: Huawei Technologies Co., Ltd., Shenzhen (CN)

(72) Inventors: Chan Wang, Shenzhen (CN); Xi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 837 days.

(21) Appl. No.: 16/086,555

(22) PCT Filed: Mar. 9, 2017

(86) PCT No.: PCT/CN2017/076192
§ 371 (c)(1),
(2) Date: Sep. 19, 2018

(87) PCT Pub. No.: WO2018/094911
PCT Pub. Date: May 31, 2018

(65) Prior Publication Data
US 2019/0102339 A1    Apr. 4, 2019

(30) Foreign Application Priority Data
Nov. 25, 2016 (CN) .......................... 201611053695.5

(51) Int. Cl.
*G06F 16/176* (2019.01)
*G06K 9/00* (2022.01)
(Continued)

(52) U.S. Cl.
CPC .......... *G06F 16/176* (2019.01); *G06F 40/186* (2020.01); *G06F 40/30* (2020.01);
(Continued)

(58) Field of Classification Search
CPC ...... G06F 16/176; G06F 40/30; G06F 40/186; G06F 11/1076; G06F 16/184;
(Continued)

(56) References Cited

U.S. PATENT DOCUMENTS

| | | | |
|---|---|---|---|
| 9,053,368 B2 | 6/2015 | Chou et al. | |
| 2012/0158935 A1 | 6/2012 | Kishimoto et al. | |

(Continued)

FOREIGN PATENT DOCUMENTS

| | | |
|---|---|---|
| CN | 101877737 A | 11/2010 |
| CN | 102368746 A | 3/2012 |

(Continued)

OTHER PUBLICATIONS

Machine Translation and Abstract of Chinese Publication No. CN102368746, Mar. 7, 2012, 14 pages.
(Continued)

*Primary Examiner* — Nimesh Patel
(74) *Attorney, Agent, or Firm* — Conley Rose, P.C.

(57) ABSTRACT

In a method, a terminal device obtains at least one template source file of a first contact in different ways, and when the terminal devices obtains a face picture in a currently displayed picture through facial recognition, and determines that a first face template included in a first face information template successfully matches the face picture, the terminal device sends, based on contact information, a multimedia file to a first contact to which the first face template belongs. The multimedia file is the picture, a picture set or a video file including the picture, or a picture or a video file generated based on the picture.

20 Claims, 7 Drawing Sheets

(51) Int. Cl.
   *G06F 40/30* (2020.01)
   *G06F 40/186* (2020.01)
(52) U.S. Cl.
   CPC ..... *G06K 9/00228* (2013.01); *G06K 9/00275* (2013.01); *G06K 9/00288* (2013.01)
(58) Field of Classification Search
   CPC ............. G06F 16/70; G06F 2211/1028; G06F 21/6218; G06F 3/04815; G06F 3/04845; G06F 9/445; G06F 40/169; G06F 21/32; G06F 9/4406; G06F 9/4411; G06F 9/44505; G06K 9/00288; G06K 9/00228; G06K 9/00275; G06K 2209/01; G06K 9/34; G06K 9/348; G06K 9/4642; Y10S 707/99953; Y10S 707/99956; Y10S 707/99939; Y10S 707/99945; Y10S 707/959; Y10S 707/99942; Y10S 707/99943; H04M 1/2757; H04M 1/576; H04M 1/72439; H04M 2201/50; H04M 2203/6081; H04M 3/567
   See application file for complete search history.

(56) References Cited

U.S. PATENT DOCUMENTS

| | | | | |
|---|---|---|---|---|
| 2012/0294495 | A1* | 11/2012 | Wren | G06K 9/00228 |
| | | | | 382/118 |
| 2012/0314916 | A1* | 12/2012 | Rothschild | G06K 9/00288 |
| | | | | 382/118 |
| 2015/0227782 | A1* | 8/2015 | Salvador | G06F 16/5854 |
| | | | | 382/118 |
| 2015/0319217 | A1* | 11/2015 | Shakib | G06K 9/00221 |
| | | | | 709/204 |
| 2016/0294893 | A1* | 10/2016 | Tovino | H04L 51/16 |
| 2016/0314619 | A1 | 10/2016 | Luo et al. | |
| 2017/0249341 | A1 | 8/2017 | Gao et al. | |

FOREIGN PATENT DOCUMENTS

| | | |
|---|---|---|
| CN | 103136533 A | 6/2013 |
| CN | 103180798 A | 6/2013 |
| CN | 103412877 A | 11/2013 |
| CN | 103945105 A | 7/2014 |
| CN | 104834665 A | 8/2015 |
| CN | 105260487 A | 1/2016 |
| CN | 105591763 A | 5/2016 |
| CN | 106034179 A | 10/2016 |
| CN | 106130887 A | 11/2016 |

OTHER PUBLICATIONS

Machine Translation and Abstract of Chinese Publication No. CN103136533, Jun. 5, 2013, 16 pages.
Machine Translation and Abstract of Chinese Publication No. CN103412877, Nov. 27, 2013, 12 pages.
Machine Translation and Abstract of Chinese Publication No. CN104834665, Aug. 12, 2015, 25 pages.
Machine Translation and Abstract of Chinese Publication No. CN105260487, Jan. 20, 2016, 12 pages.
Foreign Communication From A Counterpart Application, PCT Application No. PCT/CN2017/076192, English Translation of International Search Report dated Jul. 27, 2017, 2 pages.

* cited by examiner

MULTIMEDIA FILE SHARING METHOD AND TERMINAL DEVICE

CROSS-REFERENCE TO RELATED APPLICATIONS

This application is a U.S. National Stage of International Patent Application No. PCT/CN2017/076192 filed on Mar. 9, 2017, which claims priority to Chinese Patent Application No. 201611053695.5 filed on Nov. 25, 2016. Both of the aforementioned applications are hereby incorporated bt reference in their entireties.

TECHNICAL FIELD

This application relates to the field of information technologies, and in particular, to a multimedia file sharing method and a terminal device.

BACKGROUND

With development of terminal devices such as smartphones, tablet computers, smart cameras, and various wearable devices, many terminal devices have a function of photographing or processing multimedia files such as pictures and videos. It is becoming increasingly convenient for users to obtain various multimedia files, and the users get more pleasure in life by sharing the multimedia files with other contacts. For example, when a user participates in an activity such as a party with a friend and takes a picture for the friend by using a mobile phone, the user usually needs to share, with the corresponding friend, the picture taken for the friend.

Currently, a user shares a multimedia file with a contact usually by using the following methods:

1. The user selects a to-be-shared multimedia file from a location of storing multimedia files, selects a sending entry (a communications application) from a menu that appears, and then selects, from the communications application, a contact with whom the user wants to share, so as to send the multimedia file to the contact.

2. After obtaining a to-be-shared multimedia file through photographing or obtaining a to-be-shared multimedia file by performing editing processing on a picture or a video, the user starts a communications application, selects a contact with whom the user wants to share, opens a communications interface, selects the multimedia file by using the communications interface, and taps to send, to send the multimedia file to the contact.

3. After obtaining a to-be-shared multimedia file through photographing or obtaining a to-be-shared multimedia file by performing editing processing on a picture or a video, the user starts a communications application, establishes, through a series of operations, a group with a contact with whom the user wants to share, then opens a communications interface of the group, selects a picture taken by using the communications interface, and taps a send button, to send the multimedia file to the contact.

4. To resolve a problem of complex operations in the foregoing sharing methods, a terminal device may perform facial recognition on a face picture included in a to-be-shared multimedia file (a picture is only used as an example for description), then determine a matching degree between the face picture and a pre-stored profile image of a contact, and send a to-be-shared picture to the contact when the matching degree reaches a specified threshold. However, in this sharing method, a face picture of the contact needs to be set as the profile image of the contact. Otherwise, the terminal device cannot accurately determine a receiver of the to-be-shared picture, and further, cannot implement quick sharing.

It may be learned from descriptions of the foregoing methods that in the foregoing conventional multimedia file sharing methods, the operations are complex, or the receiver of the to-be-shared multimedia file cannot be accurately determined due to relatively poor applicability. Consequently, quick sharing cannot be implemented, and user experience is reduced.

SUMMARY

Embodiments of this application provide a multimedia file sharing method and a terminal device, to resolve problems that quick sharing cannot be implemented and user experience is reduced in a conventional multimedia file sharing method in which operations are complex, or a receiver of a to-be-shared multimedia file cannot be accurately determined due to relatively poor applicability.

According to a first aspect, an embodiment of this application provides a multimedia file sharing method. The method includes: First, a terminal device performs facial recognition on a displayed picture, to obtain a face picture in the picture. Then, the terminal device matches the face picture with a face template included in a specified face information template, and when determining that the face picture successfully matches a first face template included in the specified first face information template, determines first contact information corresponding to the first face template included in the first face information template. The first contact information indicates a method for contacting a first contact to which the first face template belongs. Finally, the terminal device sends a multimedia file to the first contact based on the first contact information. The multimedia file is the picture, a picture set or a video file including the picture, or a picture or a video file generated based on the picture.

According to the foregoing method, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the method, a user does not need to perform complex operations, and the terminal device can quickly and accurately determine the receiver when sharing the multimedia file, so that the terminal device can implement quick sharing of the multimedia file, thereby improving user experience.

In a possible design, in a scenario in which the terminal device enables a photographing function, the picture is a picture of a to-be-photographed scene that is displayed in a viewfinder frame in a process of photographing the to-be-photographed scene by the terminal device. In this case, the terminal device receives a photographing completion instruction, generates the multimedia file for the to-be-photographed scene based on the picture, and sends the multimedia file to the first contact based on the first contact information.

According to the method, after enabling the photographing function, the terminal device performs facial recognition on the picture in the viewfinder frame, and matches the face picture with the face template in the face information template, to quickly and accurately determine the receiver of the multimedia file generated after photographing is completed. Therefore, after completing the photographing, the terminal device quickly sends the generated multimedia file to the receiver, thereby implementing quick sharing of the multimedia file, and improving user experience.

In a possible design, the picture is a picture displayed by the terminal device in a multimedia file editing and production process. In this case, the terminal device sends the multimedia file to the first contact based on the first contact information after generating the multimedia file based on the picture in the multimedia file editing and production process.

According to the method, the terminal device performs facial recognition on the picture in the multimedia file editing and production process, and matches the face picture with the face template in the face information template, to quickly and accurately determine the receiver of the multimedia file generated through editing and production. Therefore, after obtaining the multimedia file through editing and production, the terminal device quickly sends the generated multimedia file to the receiver, thereby implementing quick sharing of the multimedia file, and improving user experience.

In a possible design, the first contact information includes identification information of the first contact. For example, the identification information of the first contact is a mobile phone number, an email address, or the like of the first contact. In this case, the terminal device sends the multimedia file to the first contact based on the first contact information by using the following method:

The terminal device determines a communications application based on the identification information of the first contact; and sends the multimedia file to the first contact based on the identification information of the first contact by using the communications application.

According to the foregoing method, the terminal device may determine, based on the identification information of the first contact, a communications application used when sharing the multimedia file, to accurately send the multimedia file to the first contact.

In a possible design, the first contact information includes identification information of a first communications application and identification information of the first contact. In this case, the terminal device sends the multimedia file to the first contact based on the first contact information by using the following method: The terminal device sends the multimedia file to the first contact based on the identification information of the first contact by using a communications application corresponding to the identification information of the first communications application.

According to the foregoing method, the terminal device can accurately send the multimedia file to the first contact.

In a possible design, after performing facial recognition on the picture, the terminal device obtains at least one other face picture in the picture. Then, after determining that one of the at least one other face picture successfully matches a second face template in a specified second face information template, the terminal device determines second contact information corresponding to the second face template included in the second face information template. The second contact information identifies a method for contacting a second contact to which the second face template belongs. The terminal device sends the multimedia file to the first contact and the second contact based on the first contact information and the second contact information.

According to the foregoing method, after determining that a plurality of face pictures included in the picture successfully match face templates in multi-person face templates, the terminal device can quickly and accurately send the multimedia file to a plurality of contacts, thereby implementing quick sharing of the multimedia file, and improving user experience.

In a possible design, after performing facial recognition on the picture, the terminal device obtains at least one other face picture in the picture. Then, after determining that one of the at least one other face picture successfully matches a second face template in a specified second face information template, the terminal device determines second contact information corresponding to the second face template included in the second face information template. The second contact information identifies a method for contacting a second contact to which the second face template belongs. The terminal device starts or establishes, based on the first contact information and the second contact information, a communication group including the first contact and the second contact, and sends the multimedia file in the communication group.

According to the foregoing method, after determining that a plurality of face pictures included in the picture successfully match face templates in multi-person face templates, the terminal device may send the multimedia file to a plurality of contacts by establishing a communication group, so that the terminal device does not need to send the multimedia file to each of the plurality of contacts, thereby reducing workload of the terminal device, and reducing power consumption of the terminal device.

In a possible design, the first contact information includes identification information of a first communications application and identification information of the first contact, and the second contact information includes identification information of a second communications application and identification information of the second contact. In this case, the terminal device starts or establishes the communication group by using the following method:

After determining that the identification information of the first communications application in the first contact information is the same as the identification information of the second communications application in the second contact information, the terminal device starts or establishes the communication group based on the identification information of the first contact and the identification information of the second contact by using a communications application corresponding to the identification information of the first communications application.

According to the method, the terminal device can start or establish a communication group for contacts using a same communications application.

According to a second aspect, an embodiment of this application further provides a face information template establishment method. The method includes: A terminal device determines a face template of a contact in a communications application based on obtained at least one template source file of the contact. The template source is a picture or a video file. Then, the terminal device generates contact information of the contact, and establishes a face information template based on the face template and the contact information. The face information template indicates a correspondence between the face template and the contact information, and the contact information indicates a method for contacting the contact to which the face template belongs.

According to the foregoing method, the terminal device can quickly and accurately establish the face information template for the contact. In this way, when sharing a multimedia file, the terminal device can quickly send, to the contact by using the face information template, the multimedia file needing to be shared.

In a possible design, the terminal device obtains the at least one template source file by using the following method: The terminal device obtains a communication record between a user of the terminal device and the contact, and selects the at least one template source file from the communication record. In this case, the terminal device determines the face template of the contact in the at least one template source file by using the following method: First, the terminal device obtains, from the communication record, communication information associated with each template source file. Then, the terminal device performs semantic analysis on the communication information associated with each template source file, and determines whether a face picture of the contact exists in each template source file. Finally, the terminal device determines, in the at least one template source file, a to-be-selected template source file in which a face picture of the contact exists, and determines the face template based on the face picture of the contact that exists in the to-be-selected template source file. In the foregoing design, communication content associated with any template source file satisfies any one of the following conditions: a difference between a location of the communication information and a location of the template source file falls within a specified location range, a difference between a sending time of the communication information and a sending time of the template source file falls within a specified time range, or the communication information is communication content that falls within a specified word count range before and after the template source file is sent.

The foregoing method is applicable to a scenario in which a picture or a video file including the face picture of the contact is sent between the user of the terminal device and the contact. In addition, when the user and the contact describe, in the communication information before and after the picture or the video file is sent, a face of the contact in the picture or the video file, a template source file in which a face picture of the contact exists can be quickly and accurately determined in a plurality of template source files by using the method, so as to accurately determine the face template of the contact. Obviously, according to the method, efficiency and flexibility of determining the face template by the terminal device are improved.

In a possible design, the terminal device obtains the at least one template source file by using the following method:

The terminal device obtains a communication record between a user of the terminal device and the contact, and selects the at least one template source file from the communication record. In this case, the terminal device may determine the face template of the contact in the at least one template source file by using the following method: The terminal device first determines all face pictures appearing in the at least one template source file, and then groups all the determined face pictures by using a facial recognition technology, to obtain at least one face picture group. All face pictures belonging to a same face picture group are recognized as being from a same person. The terminal device selects, from the at least one face picture group, a target face picture group including a largest quantity of face pictures, and determines the face template based on the face pictures included in the target face picture group.

According to the foregoing method, the terminal device may perform facial recognition on a template source file sent by the contact before, to obtain a largest quantity of faces, and use the face appearing for the largest quantity of times as the face template of the contact, so as to determine the face template based on the face picture including the face. The method is applicable to a scenario in which pictures or video files are frequently sent between the user of the terminal device and the contact. In addition, during actual application, a phenomenon in which the contact sends, by using the communications application, a picture or a video including a face of the contact is relatively common, and the terminal device does not need to obtain communication information of context of the picture or the video file in the method or perform voice analysis on the communication information. Therefore, according to the method, the face template can be quickly determined, and a probability that the determined face template belongs to the contact is relatively high. Therefore, according to the method, efficiency and flexibility of determining the face template by the terminal device 100 are improved.

In a possible design, the terminal device may further obtain the at least one template source file in the following two manners:

First manner: The terminal device obtains the at least one template source file stored for a video call between a user of the terminal device and the contact.

Second manner: The terminal device obtains, in a video calling process between the user and the contact, the at least one template source file in a video call displayed by the terminal device.

When the terminal device obtains the at least one template source file in the foregoing manners, the terminal device may determine the face template of the contact in the at least one template source file by using the following method:

The terminal device first determines all face pictures appearing in the at least one template source file; and then groups all the determined face pictures by using a facial recognition technology, to obtain at least one face picture group. All face pictures belonging to a same face picture group are recognized as being from a same person. Then, the terminal device determines a quantity of the at least one face picture group.

When the quantity of the at least one face picture group is 1, the terminal device determines the face template based on the face pictures included in the obtained face picture group.

When the quantity of the at least one face picture group is greater than or equal to 2, the terminal device selects a target face picture group from the at least one face picture group, where the target face picture group includes a largest quantity of face pictures, or a face picture included in the target face picture group does not match any other stored face template or a profile image of any other contact; and determines the face template based on the face picture included in the target face picture group.

According to the foregoing method, the method is applicable to a scenario in which the terminal device stores a video call record between the user and the contact or in which the user and the contact are performing a video call. In a video file of the video call or a displayed picture, the contact is usually displayed. Therefore, when determining that only one face appears in the obtained template source file, the terminal device can quickly determine the face template based on a face picture including the face, thereby improving flexibility and efficiency of determining the face template by the terminal device. When determining that a plurality of faces appear in the obtained template source file, the terminal device may select, by using a plurality of selection principles, a face picture including a face of the contact, and accurately determine the face template based on the face picture including the face, thereby improving flexibility of determining the face template by the terminal device.

In a possible design, the terminal device may further obtain the at least one template source file by using the following method: The terminal device obtains at least one template source file published by the contact in a social network of the communications application. In this case, the terminal device determines the face template of the contact in the at least one template source file by using the following method: The terminal device obtains, from the social network, published information associated with each template source file, then performs semantic analysis on the published information associated with each template source file, determines whether a face picture of the contact exists in each template source file, determines, in the at least one template source file, a to-be-selected template source file in which a face picture of the contact exists. Finally, the terminal device determines the face template based on the face picture of the contact that exists in the to-be-selected template source file. Published information associated with any template source file includes one or a combination of the following: information published by the contact when publishing the template source file, and comment information published by another contact for the template source file.

The foregoing method is applicable to a scenario in which the contact has published a picture or a video including the face picture of the contact in the social network, and the contact or another contact publishes a description about a face of the contact for the picture or the video. According to the foregoing method, the terminal device may perform semantic analysis on context of a template source file published by the contact in the social network before, so as to quickly and accurately recognize, from the template source file sent before, the template source file in which the face picture of the contact exists, and further determine the face template based on the face picture in the template source file. Obviously, according to the method, efficiency and flexibility of determining the face template by the terminal device are improved.

In a possible design, the terminal device obtains a profile image of the contact, to obtain the at least one template source file. In this case, the terminal device determines the face template of the contact in the at least one template source file in the following manner: After performing facial recognition on the profile image, to determine that the profile image is a face picture, the terminal device determines the face template based on the profile image.

The method is applicable to a scenario in which the user sets the profile image for the contact or the contact sets the profile image. In the method, the terminal device can determine the face template by quickly obtaining the profile image of the contact and quickly determining, through facial recognition, whether the profile image is a face picture. Obviously, according to the method, the face template can be quickly and accurately determined, thereby improving efficiency and flexibility of determining the face template by the terminal device.

In a possible design, the terminal device establishes the face information template based on the face template and the contact information by using the following steps:

The terminal device displays a confirmation request, and establishes the face information template based on the face template and the contact information after receiving a confirmation response of the user. The confirmation request is used to inform the user of the terminal device that the face template of the contact has been determined and request the user to confirm whether the face template is correct. The confirmation response is used to notify the terminal device that the user has confirmed that the face template is correct.

According to the foregoing method, the terminal device establishes the face information template after obtaining a confirmation of the user, so as to ensure accuracy of the face information template.

In a possible design, the contact information includes identification information of the communications application and identification information of the contact, or the contact information includes identification information of the contact.

In a possible design, the terminal device may perform the method according to the first aspect or any design for each contact in each communications application installed in the terminal device, so as to establish a plurality of face information templates. In this way, when sharing a template source file, the terminal device can quickly determine a receiver of the to-be-shared template source file by using the plurality of established face information templates, thereby implementing quick sharing of the template source file.

According to a third aspect, an embodiment of this application further provides a terminal device. The terminal device has a function of implementing operations of the terminal device in the foregoing method example in the first aspect. The function may be implemented by hardware, or may be implemented by hardware executing corresponding software. The hardware or the software includes one or more modules corresponding to the foregoing function.

In a possible design, a structure of the terminal device includes a detection unit, a processing unit, and a sending unit. These units can perform corresponding functions in the foregoing method example. For details, refer to the detailed descriptions in the method example, and details are not described herein again.

According to a fourth aspect, an embodiment of this application further provides a terminal device. The terminal device has a function of implementing operations of the terminal device in the foregoing method example in the first aspect. The function may be implemented by hardware. A structure of the terminal device includes a communications module, a processor, a bus, a display panel, and a memory. The processor, the display panel, and the memory are connected by using the bus. The display panel is configured to display a picture. The processor invokes an instruction stored in the memory, to perform the foregoing method. The communications template is configured to send a multimedia file.

In a possible design, the communications module may be an RF circuit, a WiFi module, a communications interface, a Bluetooth module, or the like.

In a possible design, the terminal device includes a camera, configured to photograph a to-be-photographed scene, to collect a picture for the to-be-photographed scene.

The display panel is configured to display a viewfinder frame. The viewfinder frame displays the picture for the to-be-photographed scene.

The terminal device further includes an input device such as a touch panel, configured to input a photographing completion instruction.

The processor is configured to: after receiving the photographing completion instruction, generate the multimedia file for the to-be-photographed scene based on the picture.

According to a fifth aspect, an embodiment of this application further provides a terminal device. The terminal device has a function of implementing operations of the terminal device in the foregoing method example in the second aspect. The function may be implemented by hardware, or may be implemented by hardware executing corresponding software. The hardware or the software includes one or more modules corresponding to the foregoing function.

In a possible design, a structure of the terminal device includes a determining unit and a processing unit. These units can perform corresponding functions in the foregoing method example. For details, refer to the detailed descriptions in the method example, and details are not described herein again.

According to a sixth aspect, an embodiment of this application further provides a terminal device. The terminal device has a function of implementing operations of the terminal device in the foregoing method example in the second aspect. The function may be implemented by hardware. A structure of the terminal device includes a processor, a bus, and a memory. The processor and the memory are connected by using the bus. The processor invokes an instruction stored in the memory, to perform the foregoing method.

In a possible design, the memory is configured to store a communication record between a user of the terminal device and a contact. The processor obtains the communication record from the memory, and selects at least one template source file from the communication record. The template source file is a picture or a video file.

In a possible design, the memory is configured to store a video file or a picture (the at least one template source file of the contact) in a video call between a user of the terminal device and the contact. The processor obtains the at least one template source file from the memory.

In a possible design, the terminal device further includes a display panel. In a video calling process between a user of the terminal device and the contact, the display panel is configured to display a video file (the at least one template source file of the contact) in a video call. The processor obtains the at least one template source file displayed in the display panel.

In a possible design, the terminal device further includes a communications module. The processor obtains at least one template source file published by the contact in a social network of the communications application or a profile image of the contact.

In a possible design, after determining a face template of the contact, the processor displays a confirmation request by using the display panel, to inform the user of the terminal device that the face template has been determined and request the user to confirm whether the face template is correct. The terminal device further includes an input unit such as a touch panel. The user enters, by using the input unit, a confirmation response used to notify the terminal device that the user has confirmed that the face template is correct.

According to a seventh aspect, an embodiment of this application further provides a computer storage medium. The storage medium stores a software program. When read and executed by one or more processors, the software program may implement the method according to the first aspect or any design of the first aspect.

According to an eighth aspect, an embodiment of this application further provides a computer storage medium. The storage medium stores a software program. When read and executed by one or more processors, the software program may implement the method according to the second aspect or any design of the second aspect.

In the embodiments of this application, the terminal device obtains the face picture in the currently displayed picture through facial recognition, and when determining that the first face template included in the first face information template successfully matches the face picture, sends, based on the first contact information in the first face information template, the multimedia file to the first contact to which the first face template belongs. The multimedia file is the picture, a picture set or a video file including the picture, or a picture or a video file generated based on the picture. According to the foregoing method, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the method, a user does not need to perform complex operations, and the terminal device can quickly and accurately determine the receiver when sharing the multimedia file, so that the terminal device can implement quick sharing of the multimedia file, thereby improving user experience.

DESCRIPTION OF EMBODIMENTS

Figure 1:
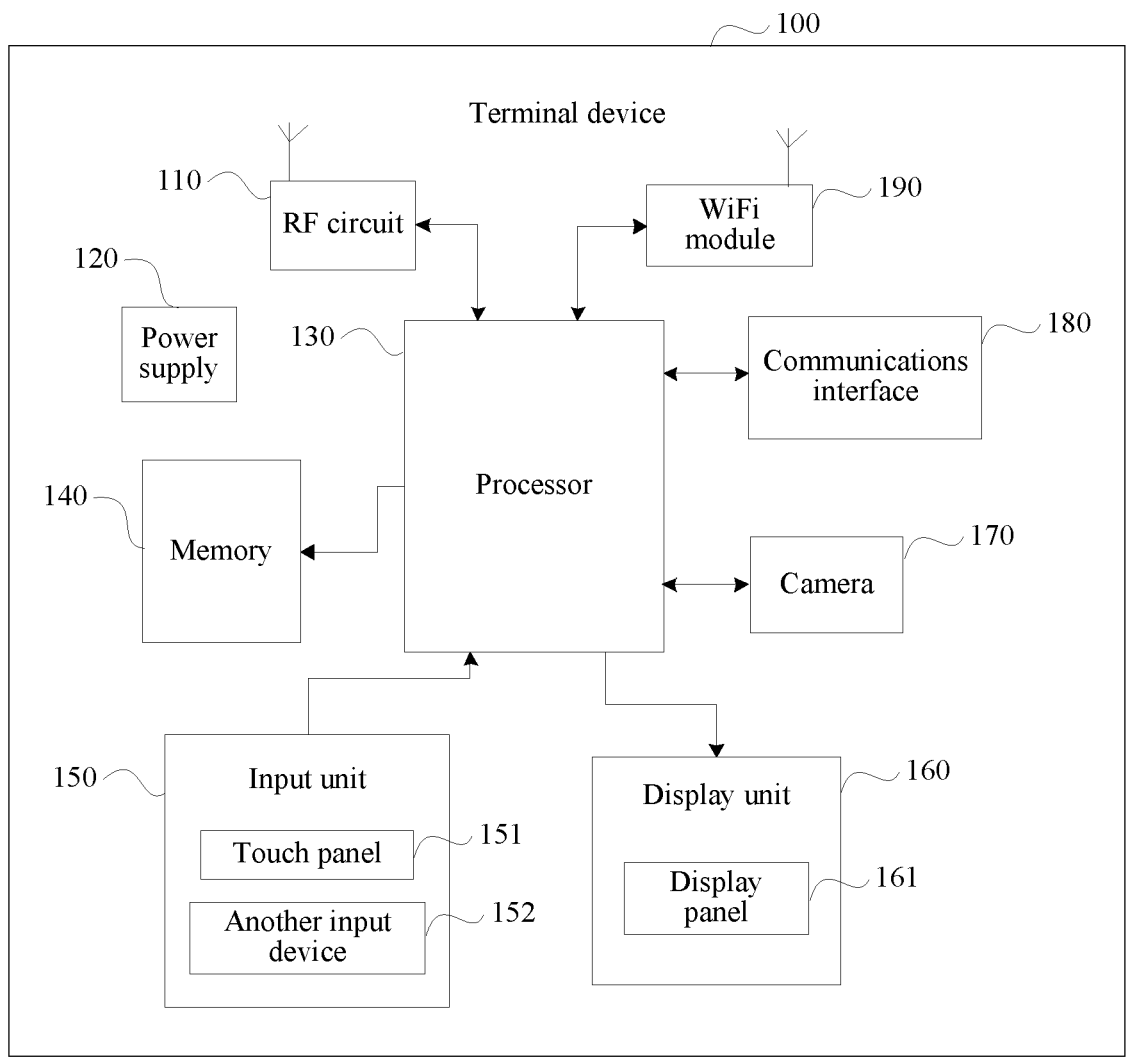
FIG. 1 is a structural diagram of a first terminal device according to an embodiment of this application.

The following further describes in detail the embodiments of this application with reference to accompanying drawings.

The embodiments of this application provide a multimedia file sharing method and a terminal device, to resolve a problem that quick sharing cannot be implemented in a conventional multimedia file sharing method in which operations are complex. The method and the terminal device described in this application are based on a same inventive concept. Principles of the method and the terminal device in resolving the problem are similar. Therefore, implementations of the terminal device and the method can be mutually referenced, and repetitions are not described.

In the embodiments of this application, a terminal device obtains a face picture in a currently displayed picture through facial recognition, and when determining that a first face template included in a first face information template successfully matches the face picture, sends, based on first contact information in the first face information template, a multimedia file to a first contact to which the first face template belongs. The multimedia file is the picture, a picture set or a video file including the picture, or a picture or a video file generated based on the picture. According to the foregoing method, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the method, a user does not need to perform complex operations, and the terminal device can quickly and accurately determine the receiver when sharing the multimedia file, so that the terminal device can implement quick sharing of the multimedia file, thereby improving user experience.

Some terms in this application are explained and described below for convenience of understanding by persons skilled in the art.

(1) A communications application in the embodiments of this application is a software set, such as a short messaging service application, a multimedia message service application, various email applications, WeChat, Tencent chat software (QQ), WhatsApp Messenger, Line (Line), Instagram (Instagram), Kakao Talk, and DingTalk, for implementing a communication service with another contact. A user may send information such as text, speech, a picture, a video file, and various other files to another contact by using the communications application.

(2) A communication group in the embodiments of this application is a contact form that can simultaneously implement multi-person communication. In a communication group, after any contact publishes information, all contacts in the communication group can receive the information.

(3) A terminal device in the embodiments of this application is also referred to as user equipment (User Equipment, UE), and is a device in which various communications applications can be installed or that has a communication function. For example, the terminal device is a smartphone, a tablet computer, various wearable devices, a vehicular device, and a computer.

(4) A multimedia file in the embodiments of this application is a picture, a picture set, or a video file including a plurality of frames of pictures.

(5) A template source file in the embodiments of this application is a picture, a video file, or the like. The template source file is used to determine a face template of a contact. A template source file of a contact may be a picture or a video file generated in a communication process between a user of a terminal device and the contact, for example, a picture or a video file in a communication record between the user and the contact, a video record or a picture record in a video calling process between the user and the contact, a profile image that is set by the user for the contact, or a profile image that is set by the contact.

(6) A face template in the embodiments of this application is used to recognize an identity of a face in a picture. The face template may be data or a picture including various feature data of a face, and the feature data is feature data of a contour such as the face, eyebrows, eyes, a nose, and a mouth. When recognizing the identity of the face in the picture, a terminal device matches a to-be-recognized face picture with the face template. If the matching succeeds, it indicates that an identity of the to-be-recognized face picture is the same as an identity of the face template.

(7) Contact information in the embodiments of this application indicates information about a method for contacting a contact.

Optionally, the contact information may include identification information of a communications application and identification information of the contact. When needing to communicate with a contact, a terminal device needs to implement communication with the contact based on identification information of the contact by using a communications application corresponding to identification information of the communications application. For example, if a method for contacting a contact is WeChat, and identification information of the contact is Zhang San, when needing to communicate with Zhang San, the terminal device needs to start WeChat, opens a session (or a chat interface) between the terminal device and Zhang San, and communicates with Zhang San in the session.

In addition, the contact information may alternatively include only identification information of the contact. The terminal device may determine, by using the identification information of the contact, a communications application used when sharing a multimedia file. For example, when the identification information of the contact is a mobile phone number, the terminal device can directly determine that the communications application used when sharing the multimedia file is a short messaging service application. For another example, when the identification information of the contact is ***@163.com, the terminal device can directly determine that the communications application used when sharing the multimedia file is a 163 email application.

(8) A face information template in the embodiments of this application indicates a correspondence between a face template and contact information. The contact information is a method for contacting a contact to which the face template belongs.

(9) "A plurality of" refers to two or more than two.

In addition, it should be understood that in descriptions of this application, words such as "first" and "second" are merely intended for purposes of description, and should not be understood as indicating or implying relative importance or a sequence.

The embodiments of this application provide a multimedia file sharing method and a terminal device. The method is applicable to a terminal device. FIG. 1 is a possible structural diagram of a terminal device. Referring to FIG. 1, the terminal device 100 includes components such as a radio frequency (Radio Frequency, RF) circuit 110, a power supply 120, a processor 130, a memory 140, an input unit 150, a display unit 160, a camera 170, a communications interface 180, and a Wireless Fidelity (Wireless Fidelity, WiFi) module 190. Persons skilled in the art may understand that a structure of the terminal device shown in FIG. 1 does not constitute a limitation on the terminal device. The terminal device provided in this embodiment of this application may include more or fewer components than those shown in the figure, some components may be combined, or a different component deployment may be used.

The components of the terminal device 100 are specifically described below with reference to FIG. 1.

The RF circuit 110 may be configured to receive and send data in a communication or call process. Particularly, after receiving downlink data from a base station, the RF circuit 110 sends the downlink data to the processor 130 for processing. In addition, the RF circuit 110 sends to-be-sent uplink data to the base station. Usually, the RF circuit 110 includes, but is not limited to, an antenna, at least one amplifier, a transceiver, a coupler, a low noise amplifier (Low Noise Amplifier, LNA), a duplexer, and the like.

In addition, the RF circuit 110 may further communicate with a network and another device through wireless communication. The wireless communication may use any communication standard or protocol, which includes, but is not limited to, Global System for Mobile Communications (Global System for Mobile Communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, Short Messaging Service (Short Messaging Service, SMS), and the like.

A WiFi technology belongs to a short-distance radio transmission technology. The terminal device 100 may be connected to an access point (Access Point, AP) by using the WiFi module 190, so as to access a data network. The WiFi module 190 may be configured to receive and send data in a communication process.

The terminal device 100 may be physically connected to another device by using the communications interface 180. Optionally, the communications interface 180 is connected to a communications interface of the another device through a cable, to implement data transmission between the terminal device 100 and the another device.

In this embodiment of this application, the terminal device 100 can implement a communication service and send a multimedia file to another contact. Therefore, the terminal device 100 needs to have a data transmission function. That is, the terminal device 100 needs to include a communications module. Although FIG. 1 shows communications modules such as the RF circuit 110, the WiFi module 190, and the communications interface 180, it may be understood that the terminal device 100 includes at least one of the foregoing components or another communications module (for example, a Bluetooth module) configured to implement communication, to perform data transmission.

For example, when the terminal device 100 is a mobile phone, the terminal device 100 may include the RF circuit 110, and may further include the WiFi module 190. When the terminal device 100 is a computer, the terminal device 100 may include the communications interface 180, and may further include the WiFi module 190. When the terminal device 100 is a tablet computer, the terminal device 100 may include the WiFi module.

The memory 140 may be configured to store a software program and a module. The processor 130 runs the software program and module that are stored in the memory 140, to perform various functional applications of the terminal device 100 and process data.

Optionally, the memory 140 may mainly include a program storage area and a data storage area. The program storage area may store an operating system, various application programs (for example, a communications application), a facial recognition module, and the like. The data storage area may store data (for example, a multimedia file such as various pictures and video files, and a face information template) created based on use of the terminal device, and the like.

In addition, the memory 140 may include a high-speed random access memory, and may further include a non-volatile memory, for example, at least one magnetic disk storage component, a flash memory component, or another volatile solid-state storage component.

The input unit 150 may be configured to receive digit or character information entered by a user, and generate a keyboard signal input related to user settings and function control of the terminal device 100.

Optionally, the input unit 150 may include a touch panel 151 and another input device 152.

The touch panel 151, which is also referred to as a touchscreen, may collect a touch operation of a user on or near the touch panel 151 (for example, an operation of the user on or near the touch panel 151 by using any suitable object or accessory such as a finger or a stylus), and drive a corresponding connection apparatus based on a preset program. Optionally, the touch panel 151 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 130. Moreover, the touch controller can receive and execute a command sent from the processor 130. In addition, the touch panel 151 may be implemented in a plurality of types, such as a resistive type, a capacitive type, an infrared type, and a surface acoustic wave type.

Optionally, the another input device 152 may include, but is not limited to, one or more of a physical keyboard, a functional key (for example, a volume control key or a switch key), a track ball, a mouse, a joystick, and the like.

The display unit 160 may be configured to display information entered by a user or information provided for a user, and various menus of the terminal device 100. The display unit 160 is a display system of the terminal device 100, and is configured to present an interface and implement human-machine interaction.

The display unit 160 may include a display panel 161. Optionally, the display panel 161 may be configured in a form of a liquid crystal display (Liquid Crystal Display, LCD), an organic light-emitting diode (Organic Light-Emitting Diode, OLED), or the like.

Further, the touch panel 151 may cover the display panel 161. After detecting the touch operation on or near the touch panel 151, the touch panel 151 transfers the touch operation to the processor 130, to determine a type of a touch event. Then, the processor 130 provides corresponding visual output on the display panel 161 according to the type of the touch event.

Although, in FIG. 1, the touch panel 151 and the display panel 161 are used as two separate parts to implement input and output functions of the terminal device 100, in some embodiments, the touch panel 151 and the display panel 161 may be integrated to implement the input and output functions of the terminal device 100.

The processor 130 is a control center of the terminal device 100 and is connected to the components by using various interfaces and lines. The processor 130 runs or executes the software program and/or module stored in the memory 140, and invokes the data stored in the memory 140, to perform various functions of the terminal device 100 and process data, so as to implement a plurality of services based on the terminal device.

Optionally, the processor 130 may include one or more processing units. Optionally, the processor 130 may integrate an application processor and a modem processor. The application processor mainly processes the operating system, a user interface, the application program, and the like. The modem processor mainly processes wireless communication. It may be understood that the modem processor may alternatively not be integrated into the processor 130.

The camera 170 is configured to implement a photographing function of the terminal device 100, to take a picture or shoot a video.

The terminal device 100 further includes the power supply 120 (for example, a battery) configured to supply power to each component. Optionally, the power supply 120 may be logically connected to the processor 130 by using a power supply management system, to implement functions such as charging, discharging, and power consumption management by using the power supply management system.

Although not shown, the terminal device 100 may further include at least one sensor, an audio frequency circuit, and the like, and details are not described herein.

Figure 2:
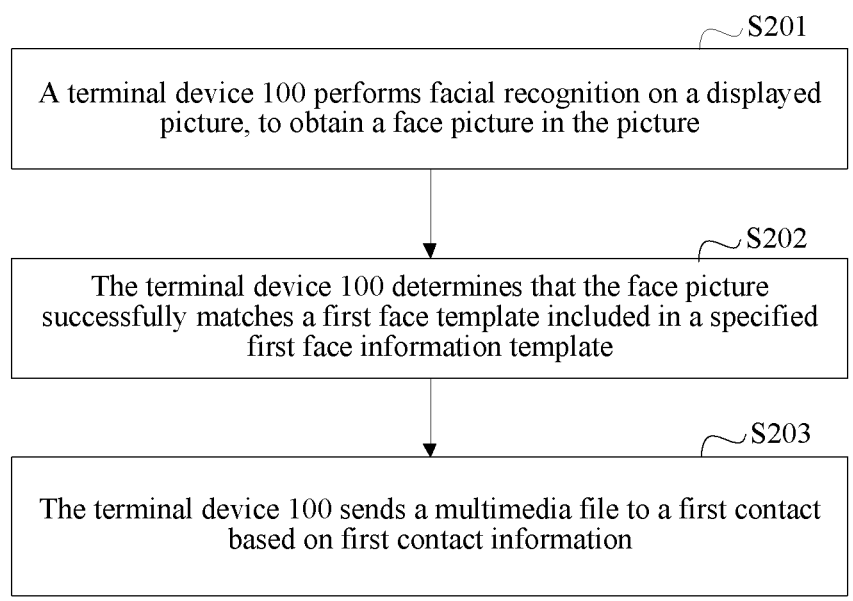
FIG. 2 is a flowchart of a multimedia file sharing method according to an embodiment of this application.

An embodiment of this application provides a multimedia file sharing method. The method is applicable to the terminal device 100 shown in FIG. 1. Therefore, in this embodiment of this application, the terminal device 100 is only used as an example for description. Referring to FIG. 2, a specific procedure of the method includes the following steps.

S201: The terminal device 100 performs facial recognition on a displayed picture, to obtain a face picture in the picture.

The picture is a picture displayed in the display panel 161 of the terminal device 100.

Optionally, the method provided in this embodiment of this application may be applied to various scenarios. Certainly, in different scenarios, the picture displayed by the terminal device 100 and a to-be-shared multimedia file are also different. The following several scenarios are only used for description in this embodiment of this application.

First scenario: The terminal device 100 enables a photographing function.

In the first scenario, the picture may be a picture of a to-be-photographed scene that is collected by using the camera 170 and displayed in a viewfinder frame of the display panel 161 in a process in which the terminal device 100 controls the camera 170 to photograph the to-be-photographed scene.

Optionally, in the first scenario, the terminal device 100 may perform S201 after the photographing function is enabled and the picture of the to-be-photographed scene that is displayed in the viewfinder frame is stabilized for preset duration (such as three seconds). Alternatively, a key for enabling or disabling a multimedia file sharing function is disposed on the terminal device 100. After the picture of the to-be-photographed scene that is displayed in the viewfinder frame, the terminal device 100 receives an instruction of a user, taps the key for enabling or disabling the multimedia file sharing function, and then performs S201. Further alternatively, the terminal device 100 determines whether a face exists in the picture displayed in the viewfinder frame, or when a quantity of existing faces exceeds a specified quantity, performs S201.

Correspondingly, in the first scenario, a multimedia file to be sent (or shared) by the terminal device 100 in S203 is a picture or a video file of the to-be-photographed scene that is generated by the terminal device 100 based on the picture in the viewfinder frame when the terminal device 100 receives a photographing completion instruction.

Second scenario: The processor 130 of the terminal device 100 edits and produces a picture or a video file.

In the second scenario, the picture may be a to-be-edited picture displayed in the display panel 161 or a frame of a picture in a to-be-edited video file in a multimedia file editing and production process of the terminal device 100.

Correspondingly, in the second scenario, a multimedia file to be sent (or shared) by the terminal device in S203 is a picture or a video edited and produced based on the picture.

Third scenario: A user of the terminal device 100 wants to share a picture stored in the memory 140 of the terminal device 100.

In the third scenario, the picture is a to-be-shared picture stored in the memory 140, and a multimedia file to be sent (or shared) by the terminal device 100 in S203 is the to-be-shared picture stored in the memory 140.

Fourth scenario: A user of the terminal device 100 wants to share a picture set or a video file stored in the memory 140.

In the fourth scenario, the picture is a picture in the to-be-shared picture set stored in the memory 140 or a frame of a picture in the to-be-shared video file.

Correspondingly, in the third scenario, a multimedia file to be sent (or shared) by the terminal device 100 in S203 is the picture set or the video file.

Optionally, the terminal device 100 performs S201 by using the following steps:

running, by the processor 130 of the terminal device 100, the facial recognition module stored in the memory 140, and performing facial recognition on the picture, to determine whether a face picture exists in the picture; and when determining that a face picture exists in the picture, capturing, by the processor 130, the face picture in the picture.

In the foregoing various scenarios, before sharing the multimedia file, the user first needs to determine an identity of a face existing in the picture. Correspondingly, the identity of the face is a receiver when the multimedia file is shared. According to this step, the processing device 100 can accurately obtain the face picture in the displayed picture, so as to obtain an identity of a face in the face picture subsequently through analysis.

Optionally, when determining that a plurality of face pictures exist in the picture, the processor 130 may capture the face picture that has an obvious clear facial feature and that falls within a specified pixel range.

S202: The terminal device 100 determines that the face picture successfully matches a first face template included in a specified first face information template.

The first face information template indicates a correspondence between the first face template and first contact information, and the first contact information indicates a method for contacting a first contact to which the first face template belongs.

Optionally, the memory 140 of the terminal device 100 stores a plurality of face information templates, and each face information template indicates a correspondence between a face template and contact information.

When the terminal device 100 performs S202, S202 specifically includes the following steps:

running, by the processor 130 of the terminal device 100, the facial recognition module in the memory 140, and matching, by using various conventional facial matching algorithms, the face picture with each of a plurality of face templates included in the plurality of face information templates; and determining that the face picture successfully matches the first face template in the plurality of face templates.

The face picture successfully matches the first face template, that is, the face picture and the first face template belong to a same person. Therefore, by using the foregoing method, the terminal device 100 can determine an identity of a face in the face picture by using the first face template successfully matching the face picture, that is, determine the receiver when sharing the multimedia file.

After determining the receiver of the multimedia file, the terminal device 100 further needs to determine contact information of the receiver, to send the multimedia file to the receiver. The identity of the face may be presented by using the first contact information, and the first contact information indicates the contact information of the first contact. Therefore, the terminal device 100 may send the multimedia file to the receiver of the multimedia file, that is, the first contact, by using the first contact information.

Optionally, after the terminal device 100 determines that the face picture successfully matches the first face template, and before the terminal device 100 performs S203, the method may include:

sending, by the processor 130, prompt information to the user by using the display panel 161, to prompt the user to use the first contact in the first contact information as the receiver of the multimedia file; and performing, by the terminal device 100, S203 after the user sends a confirmation instruction to the processor 130 by using the touch panel 151 or the another input device 152.

According to the foregoing method, before sharing the multimedia file, the terminal device 100 first confirms with the user whether a contact is accurate, to avoid sending the multimedia file to a wrong contact, thereby improving user experience.

S203: The terminal device 100 sends the multimedia file to the first contact based on the first contact information.

The multimedia file is the picture, a picture set or a video file including the picture, or a picture or a video file generated based on the picture.

Optionally, the processor 130 of the terminal device 100 may send the multimedia file by using any communications module in the RF circuit 110, the WiFi module 190, or the communications interface 180 or another communications module. This is not limited in this embodiment of this application.

Optionally, in the first scenario, the terminal device 100 performs S203 by using the following step:

receiving, by the terminal device 100, a photographing completion instruction, generating the multimedia file for the to-be-photographed scene based on the picture, and sending the multimedia file to the first contact based on the first contact information.

Optionally, the receiving, by the terminal device 100, a photographing completion instruction, and generating the multimedia file based on the picture includes the following steps: after the touch panel of the terminal device 100 is touched or the another input device inputs the photographing completion instruction, sending, by the input unit 150, the photographing completion instruction to the processor 130; and controlling, by the processor 130, the camera 170 to complete photographing, to obtain the multimedia file.

Optionally, in the second scenario, the terminal device 100 performs S203 by using the following step:

sending, by the terminal device, the multimedia file to the first contact based on the first contact information after generating the multimedia file based on the picture in the multimedia file editing and production process.

Optionally, in the third scenario and the fourth scenario, after the terminal device 100 performs S202, or after the processor 130 of the terminal device 100 receives the confirmation instruction, the terminal device 100 directly performs S203. This is not limited in this application.

Optionally, the contact information included in the face information template includes identification information of a communications application and identification information of a contact. The identification information of the contact is information that can be used to recognize the contact in the communications application, for example, an account, a nickname, or a two-dimensional barcode. Correspondingly, the first contact information includes identification information of a first communications application and identification information of the first contact. In this case, the sending, by the terminal device 100, the multimedia file to the first contact based on the first contact information includes:

sending, by the terminal device 100, the multimedia file to the first contact based on the identification information of the first contact by using a communications application corresponding to the identification information of the first communications application.

For example, when the first communications application is WeChat, and the identification information of the contact is "Zhang San", the processor 130 of the terminal device 100 starts WeChat (when WeChat does not run in the background), opens a WeChat interface in the display panel 161, then opens a communications interface for "Zhang San", and inputs the multimedia file on the communications interface, to send the multimedia file to Zhang San.

Optionally, the contact information included in the face information template includes identification information of a contact. In this case, the terminal device 100 may determine, based on the identification information of the contact, a communications application used when sending the multimedia file. In this case, the sending, by the terminal device 100, the multimedia file to the first contact based on the first contact information includes:

determining, by the terminal device, a communications application based on identification information of the first contact; and sending, by the terminal device, the multimedia file to the first contact based on the identification information of the first contact by using the communications application.

Optionally, in S201, after performing facial recognition on the picture, the terminal device 100 may further obtain at least one other face picture in the picture. In this case, same as a procedure of determining the identity of the face in the face picture by the terminal device 100, the processor 130 of the terminal device 100 runs the facial recognition module in the memory 140, and performs, by using the facial matching algorithms, facial matching on each of the at least one other face picture with each of the face templates included in the plurality of face information templates.

When the terminal device 100 determines that one of the at least one other face picture successfully matches a second face template in a specified second face information template, where the second face information template identifies a correspondence between the second face template and second contact information, and the second contact information indicates contact information of a second contact to which the second face template belongs, the terminal device 100 may send the multimedia file to the second contact in the foregoing manner of sending the multimedia file to the first contact.

Similarly, when determining that one of the at least one other face picture successfully matches a third face template in a specified third face information template, the terminal device 100 continues to send the multimedia file to a third contact in the foregoing sending manner.

According to the foregoing method, the terminal device 100 can quickly and accurately determine identities of faces in a plurality of face pictures through facial recognition and matching between the face pictures and the face templates in the face information templates, that is, determine a plurality of receivers when sharing the multimedia file, so as to determine contact information of the plurality of receivers. Further, the multimedia file is quickly shared based on the contact information of the plurality of receivers, thereby improving efficiency of sharing the multimedia file.

Optionally, when the terminal device determines that at least two face pictures in the picture successfully match face templates in two face information templates respectively, this embodiment of this application further provides another manner of sending the multimedia file. Specific steps are as follows:

when performing S201, after performing facial recognition on the picture, obtaining, by the terminal device 100, at least one other face picture in the picture; and determining, by the terminal device 100, that one of the at least one other face picture successfully matches a second face template in a specified second face information template, where the second face information template indicates a correspondence between the second face template and second contact information, and the second contact information indicates contact information of a second contact to which the second face template belongs.

That the terminal device 100 performs S203 includes:

starting or establishing, by the terminal device 100, a communication group based on the first contact information and the second contact information, where the communication group includes the first contact and the second contact; and sending, by the terminal device 100, the multimedia file in the communication group.

In addition, similarly, when determining that one of the at least one other face picture successfully matches a third face template in a specified third face information template, the terminal device 100 starts or establishes, based on the first contact information, the second contact information, and third contact information in the third face information template, a communication group including three contacts.

According to the foregoing method, after determining that the plurality of face pictures included in the picture successfully match the face templates in multi-person face templates, the terminal device 100 may send the multimedia file to a plurality of contacts by establishing a communication group, so that the terminal device 100 does not need to send the multimedia file to each of the plurality of contacts, thereby reducing workload of the terminal device 100, and reducing power consumption of the terminal device 100.

Optionally, when the first contact information includes the identification information of the first communications application and the identification information of the first contact, and the second contact information includes identification information of a second communications application and identification information of the second contact, the starting or establishing, by the terminal device 100, a communication group based on the first contact information and the second contact information includes:

determining, by the terminal device 100, that the identification information of the first communications application in the first contact information is the same as the identification information of the second communications application in the second contact information; and starting or establishing, by the terminal device 100 the communication group based on the identification information of the first contact and the identification information of the second contact by using a communications application corresponding to the identification information of the first communications application.

Optionally, the starting or establishing, by the terminal device 100, the communication group based on the identification information of the first contact and the identification information of the second contact includes:

determining, by the terminal device 100, whether a communication group established based on the identification information of the first contact and the identification information of the second contact exists in the communications application; and if the communication group exists, directly starting the communication group; or if the communications group does not exist, establishing, by the terminal device 100, the communication group based on the identification information of the first contact and the identification information of the second contact.

Optionally, after starting or establishing the communication group, the terminal device 100 may inform, by using the display panel 161, the user that the communication group has been established. The user may further add another contact (for example, a contact that exists in the picture but that is not recognized through facial recognition or a contact to which a face picture failing to match a face template belongs) to the communication group, thereby improving user experience.

According to the method provided in this embodiment of this application, the terminal device obtains the face picture in the currently displayed picture through facial recognition, and when determining that the first face template included in the first face information template successfully matches the face picture, sends, based on the first contact information in the first face information template, the multimedia file to the first contact to which the first face template belongs. The multimedia file is the picture, a picture set or a video file including the picture, or a picture or a video file generated based on the picture. According to the foregoing method, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the method, a user does not need to perform complex operations, and the terminal device can quickly and accurately determine the receiver when sharing the multimedia file, so that the terminal device can implement quick sharing of the multimedia file, thereby improving user experience.

Figure 3:
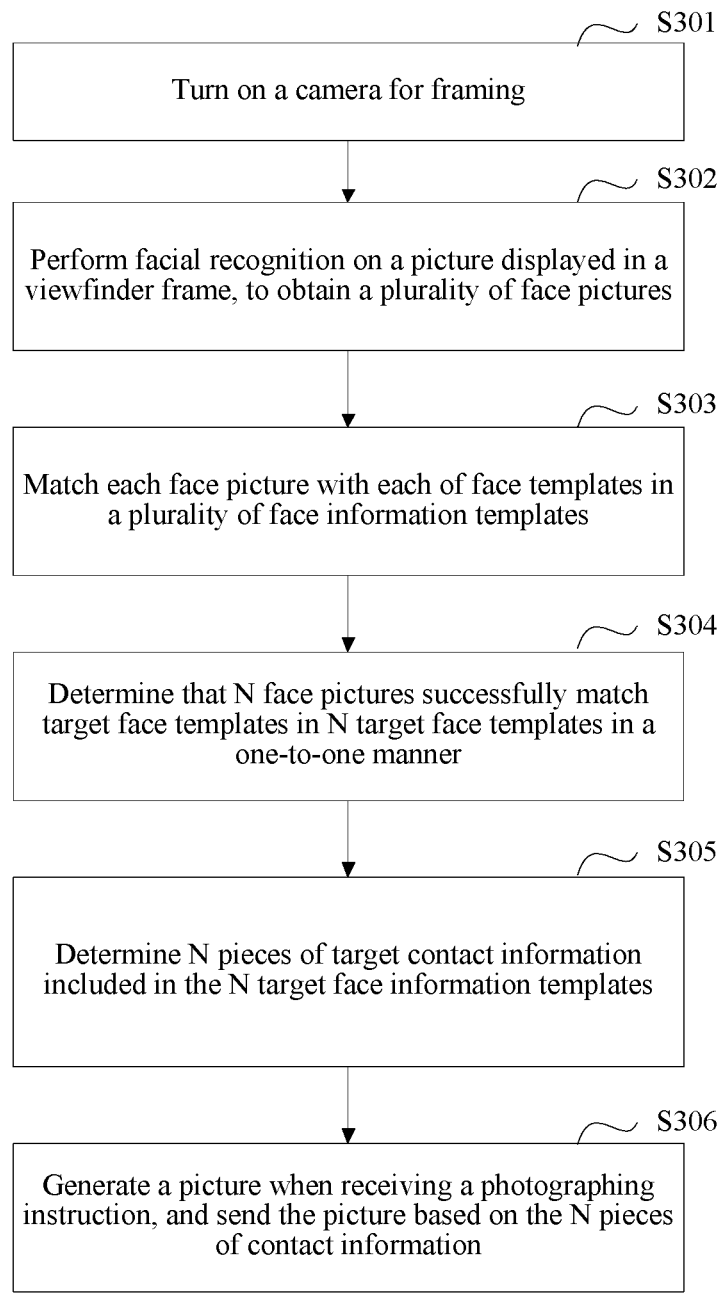
FIG. 3 is a flowchart of an example of a picture sharing method according to an embodiment of this application.
Figure 4:
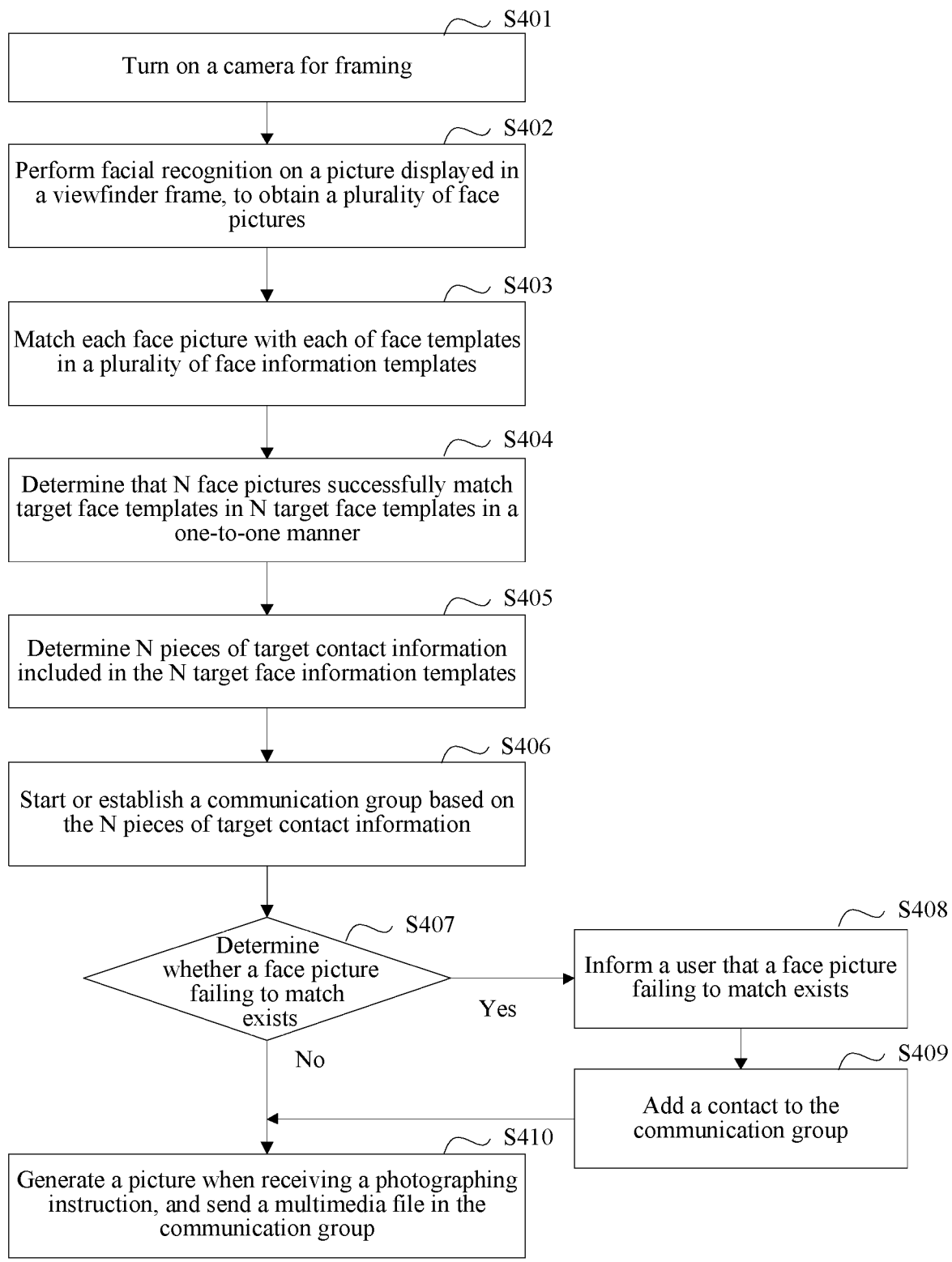
FIG. 4 is a flowchart of another example of a picture sharing method according to an embodiment of this application.

Based on the foregoing embodiment, an embodiment of this application provides an example of a picture sharing method. The method is applicable to a scenario in which a terminal device enables a photographing function and turns on a camera to take pictures for a plurality of people. Referring to FIG. 3, the method includes the following steps.

S301: The terminal device turns on a camera for framing.

S302: The terminal device performs facial recognition on a picture displayed in a viewfinder frame, to obtain a plurality of face pictures.

S303: The terminal device matches each face picture with each of face templates in a plurality of face information templates.

Any face information template indicates a correspondence between a face template and contact information, and the contact information indicates contact information of a contact to which the face template belongs.

S304: The terminal device determines that N face pictures successfully match target face templates in N target face templates in a one-to-one manner, where N is a positive integer.

S305: The terminal device determines N pieces of target contact information included in the N target face information templates.

According to this step, the terminal device determines that identities of faces in the N face pictures (N receivers of a picture to be generated in S305) can be presented by using the N pieces of target contact information. Therefore, the terminal device may send the picture to the N receivers based on the N pieces of target contact information.

S306: The terminal device generates a picture when receiving a photographing instruction, and sends the picture based on the N pieces of target contact information. In this way, the terminal device can share and send the picture to the N receivers of the picture.

In the foregoing example, after enabling the photographing function, the terminal device performs facial recognition on the picture in the viewfinder frame, and matches the face pictures with the face templates in the face information templates, to quickly and accurately determine identities of faces in the plurality of face pictures, that is, determine a plurality of receivers when sharing a picture subsequently taken, so as to determine contact information of the plurality of receivers, and quickly share the picture based on the contact information of the plurality of receivers. Therefore, a user does not need to perform complex operations in a photographing process, and the terminal device can quickly and accurately determine the receivers when sharing the multimedia file, so that the terminal device can implement quick sharing of the picture, thereby improving user experience.

Based on the foregoing embodiment, an embodiment of this application provides another example of a picture sharing method. The method is applicable to a scenario in which a terminal device enables a photographing function and turns on a camera to take pictures for a plurality of people. Referring to FIG. 3, the method includes the following steps.

S401 to S405 are the same as S301 to S305 in the example shown in FIG. 3, and details are not described herein again. A difference is that in this example, N is a positive integer greater than 2.

S406: The terminal device starts or establishes a communication group based on the N pieces of target contact information.

Optionally, there may be one or more communication groups.

Optionally, the contact information in the face information template includes identification information of a communications application and identification information of a contact. The terminal device determines types of communications applications included in the N pieces of target contact information, then determines that target contact information of a same type in the N pieces of target contact information is classified into a same group, and starts or establishes a communication group for each group of target contact information.

For example, if the terminal device determines that in five pieces of target contact information, communications applications included in three pieces of first target contact information are QQ, and communications applications included in the other two pieces of second target contact information are WeChat, when performing S406, the terminal device needs to start QQ, and starts or establishes a first communication group based on identification information of contacts included in the three pieces of first target information. Further, the terminal device needs to start WeChat, and starts or establishes a second communication group based on identification information of contacts included in the two pieces of second target contact information.

S407: The terminal device determines whether a face picture failing to match exists in the plurality of face pictures, and if the face picture exists, performs S408, or if the face picture does not exist, performs S410.

S408: The terminal device informs a user that a face picture failing to match exists.

S409: After receiving a contact addition instruction of the user, the terminal device adds a contact to the communication group.

S410: The terminal device generates a picture when receiving a photographing instruction, and sends the multimedia file in the communication group.

In the foregoing example, after enabling the photographing function, the terminal device performs facial recognition on the picture in the viewfinder frame, and matches the face pictures with the face templates in the face information templates, to quickly and accurately determine identities of faces in the plurality of face pictures, that is, determine a plurality of receivers when sharing a picture subsequently taken, so as to determine contact information of the plurality of receivers. Further, the terminal device may establish a communication group based on the contact information of the plurality of receivers, and sends the picture to the plurality of receivers, to quickly share the picture. Therefore, the user does not need to perform complex operations in a photographing process, and the terminal device can quickly and accurately determine the receivers when sharing the multimedia file, so that the terminal device can implement quick sharing of the picture, thereby improving user experience. Further, the terminal device does not need to send the picture to each of the plurality of receivers, thereby reducing workload of the terminal device, and reducing power consumption of the terminal device.

In the multimedia file sharing method provided in the foregoing embodiment of this application, the terminal device needs to store at least one face information template, so that the terminal device can match the face pictures in the picture with the face templates in the face information templates. Optionally, the face information template is set by the user, or is established by the terminal device based on a video or a picture related to the contact in the communications application. The video or the picture related to the contact is a video or a picture in a communication record between the user of the terminal device and the contact, a picture in a video record of a video call previously performed between the user and the contact or in a video of a video call being performed between the user and the contact, a profile image of the contact that is set by the user or the contact, or the like.

Figure 5:
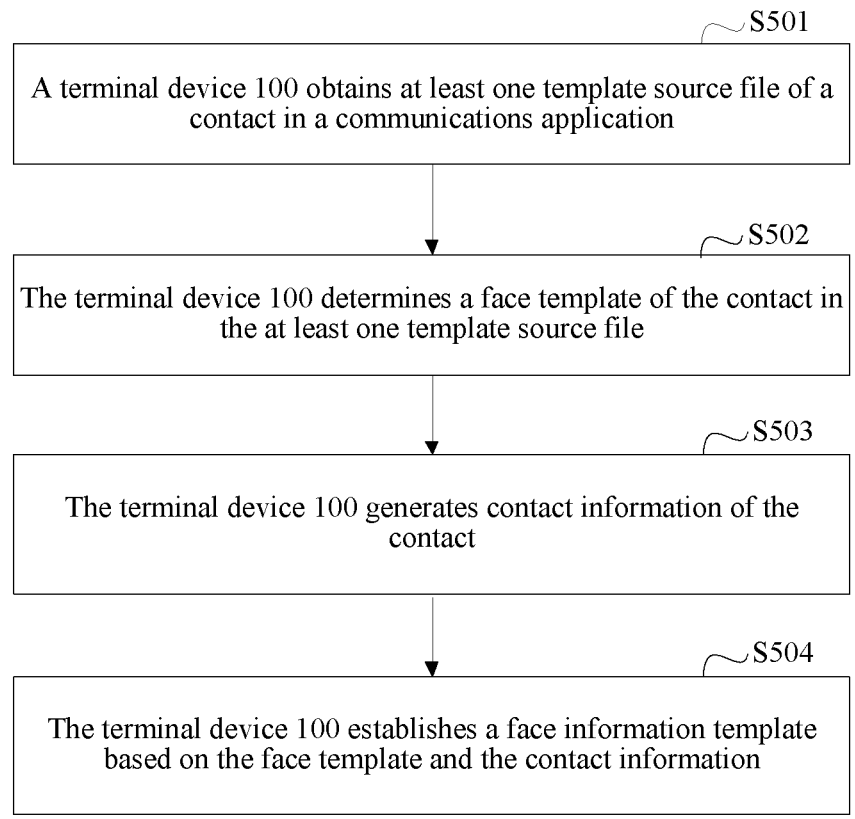
FIG. 5 is a flowchart of a face information template establishment method according to an embodiment of this application.

An embodiment of this application further provides a face information template establishment method. The method is also applicable to the terminal device 100 shown in FIG. 1. Therefore, in this embodiment of this application, the terminal device 100 is only used as an example for description. Referring to FIG. 5, a specific procedure of the method includes the following steps.

S501: The terminal device 100 obtains at least one template source file of a contact in a communications application, where the template source file is a picture or a video file.

Optionally, the processor 130 of the terminal device 100 obtains the at least one template source file from the memory 140.

S502: The terminal device 100 determines a face template of the contact in the at least one template source file.

Optionally, the processor 130 of the terminal device 100 determines the face template of the contact.

The processor 130 may obtain the at least one template source file and determine the face template of the contact by using a plurality of methods. A plurality of implementation scenarios are divided below based on a method for obtaining the at least one template source file and determining the face template of the contact by the processor 130.

First possible implementation scenario: The terminal device 100 may obtain, in the following manner, at least one template source file sent by the contact:

The processor 130 obtains a communication record that is between a user of the terminal device 100 and the contact and that is stored in the memory 140, and selects the at least one template source file from the communication record.

In the first scenario, the processor 130 determines the face template of the contact in the at least one template source file by using the following method:

The processor 130 obtains, from the communication record, communication information associated with each template source file.

The processor 130 runs a semantic analysis module in the memory 140, performs semantic analysis on the communication information associated with each template source file, and determines whether a face picture of the contact exists in each template source file. For example, the processor 130 performs semantic analysis on communication information associated with a picture, and when determining that the communication information includes words such as "my face", "my photo", and "my eyes" for describing a face of the contact, determines that the face picture of the contact exists in the picture.

The processor 130 determines a to-be-selected template source file in the at least one template source file, and the to-be-selected template source file is a template source file including a picture in which a face picture of the contact exists.

The processor 130 determines the face template based on the face picture of the contact that exists in the to-be-selected template source file.

According to the foregoing method, when the user and the contact describe, in the communication information before and after a picture or a video file is sent, the face of the contact in the picture or the video file, according to the foregoing method, a template source file in which a face picture of the contact exists can be quickly determined in a plurality of template source files, so as to determine the face template of the contact.

In the first scenario, communication content associated with any template source file satisfies any one of the following conditions:

1. A difference between a location of the communication information and a location of the template source file falls within a specified location range. In the communications application, a location of the communication content (the communication information or the template source file) is a location of the communication content in the communication record. Communication content sent once in the communication record is used as one piece of communication content. Therefore, in the communication record, communication content sent at different times may be distinguished on a per-piece basis. Therefore, the location of the communication content is a sequence number of the communication content in the communication record. For example, communication content related to the template source file is communication content whose sequence number falls within five pieces from the template source file.

2. A difference between a sending time of the communication information and a sending time of the template source file falls within a specified time range. For example, the communication information is communication content whose sending time falls within 10 minutes from the sending time of the template source file.

3. The communication information is communication content that falls within a specified word count range before and after the template source file is sent. For example, the communication information is communication content that falls within 100 words before and after the template source file.

According to the foregoing method, the terminal device 100 may perform semantic analysis on context of a template source file sent by the contact before, so as to recognize, from the template source file sent before, a template source file in which a face picture of the contact exists, and further determine the face template based on the face picture in the template source file. The method is applicable to a scenario in which a picture or a video file including the face picture of the contact has been sent between the user of the terminal device and the contact. In addition, when the user and the contact describe, in the communication information before and after the picture or the video file is sent, the face of the contact in the picture or the video file, the template source file in which the face picture of the contact exists can be quickly and accurately determined in the plurality of template source files by using the method, so as to accurately determine the face template of the contact. Obviously, according to the method, efficiency and flexibility of determining the face template by the terminal device 100 are improved.

Second possible implementation scenario: The terminal device 100 may obtain, in the following manner, at least one template source file sent by the contact:

The processor 130 obtains a communication record between a user of the terminal device and the contact that is stored in the memory 140, and selects the at least one template source file from the communication record.

In the second scenario, the processor 130 determines the face template of the contact in the at least one template source file by using the following method, including:

The processor 130 runs the facial recognition module in the memory 140, and determines all face pictures appearing in the at least one template source file.

The processor 130 continues running the facial recognition module, and groups all the determined face pictures by using a facial recognition technology, to obtain at least one face picture group, where all face pictures belonging to a same face picture group are recognized as being from a same person.

The processor 130 selects, from the at least one face picture group, a target face picture group including a largest quantity of face pictures.

The processor 130 determines the face template based on the face pictures included in the target face picture group.

According to the foregoing method, the terminal device 100 may perform facial recognition on a template source file sent by the contact before, to obtain a largest quantity of faces, and use the face appearing for the largest quantity of times as the face template of the contact, so as to determine the face template based on the face picture including the face. The method is applicable to a scenario in which pictures or video files are frequently sent between the user of the terminal device 100 and the contact. In addition, during actual application, a phenomenon in which the contact sends, by using the communications application, a picture or a video including a face of the contact is relatively common, and the terminal device 100 does not need to obtain communication information of context of the picture or the video file in the method or perform voice analysis on the communication information. Therefore, according to the method, the face template can be quickly determined, and a probability that the determined face template belongs to the contact is relatively high. Therefore, according to the method, efficiency and flexibility of determining the face template by the terminal device 100 are improved.

Third possible implementation scenario: The terminal device 100 may obtain, in the following two manners, at least one template source file sent by the contact:

First manner: The processor 130 obtains the at least one template source file that is stored in the memory 140 for a video call between the user of the terminal device and the contact and that is sent by the contact.

Second manner: The processor 130 obtains, in a video calling process between the user and the contact, the at least one template source file in a video call displayed in the display panel 161 of the terminal device 100.

Optionally, in the third scenario, the template source file may be a video file or a frame of a picture in a video file.

In the third scenario, the processor 130 determines the face template of the contact in the at least one template source file by using the following method:

The processor 130 runs the facial recognition module in the memory 140, and determines all face pictures appearing in the at least one template source file.

The processor 130 continues running the facial recognition module, and groups all the determined face pictures by using a facial recognition technology, to obtain at least one face picture group, where all face pictures belonging to a same face picture group are recognized as being from a same person.

When a quantity of the at least one face picture group is 1, the processor 130 determines the face template based on the face pictures included in the obtained face picture group.

When a quantity of the at least one face picture group is greater than or equal to 2, the processor 130 selects a target face picture group from the at least one face picture group, where the target face picture group includes a largest quantity of face pictures, or a face picture included in the target face picture group does not match any other stored face template or a profile image of any other contact; and determines the face template based on the face picture included in the target face picture group.

The method is applicable to a scenario in which the terminal device 100 stores a video call record between the user and the contact or in which the user and the contact are performing a video call. In a video file of the video call or a displayed picture, the contact is usually displayed. Therefore, when determining that only one face appears in the obtained template source file, the terminal device 100 can quickly determine the face template based on a face picture including the face, thereby improving flexibility and efficiency of determining the face template by the terminal device 100. When determining that a plurality of faces appear in the obtained template source file, the terminal device 100 may select, by using a plurality of selection principles, a face picture including a face of the contact, and accurately determine the face template based on the face picture including the face, thereby improving flexibility of determining the face template by the terminal device 100.

Fourth possible implementation scenario: The terminal device 100 may obtain, in the following manner, at least one template source file published by the contact:

The processor 130 starts a social network of the communications application (for example, Zone of QQ and Moments of WeChat). The processor 130 obtains at least one template source file published by the contact in the social network of the communications application.

In the fourth scenario, the processor 130 determines the face template of the contact in the at least one template source file by using the following method:

The processor 130 obtains, from the social network, published information associated with each template source file. Published information associated with any template source file includes one or a combination of the following: information published by the contact when sending the template source file, and comment information published by another contact for the template source file.

The processor 130 runs a semantic analysis module in the memory 140, performs semantic analysis on the published information associated with each template source file, and determines whether a face picture of the contact exists in each template source file.

The processor 130 determines a to-be-selected template source file in the at least one template source file, and the to-be-selected template source file is a template source file in which a face picture of the contact exists.

The processor 130 determines the face template based on the face picture of the contact that exists in the to-be-selected template source file.

The foregoing method is applicable to a scenario in which the contact has published a picture or a video including the face picture of the contact in the social network, and the contact or another contact publishes a description about a face of the contact for the picture or the video.

According to the foregoing method, the terminal device 100 may perform semantic analysis on context of a template source file published by the contact in the social network before, so as to quickly and accurately recognize, from the template source file sent before, the template source file in which the face picture of the contact exists, and further determine the face template based on the face picture in the template source file. Obviously, according to the method, efficiency and flexibility of determining the face template by the terminal device 100 are improved.

Fifth possible implementation scenario: The terminal device 100 may obtain, in the following manner, at least one template source file published by the contact:

The processor 130 obtains a profile image of the contact.

In the fifth scenario, the processor 130 determines the face template of the contact in the at least one template source file by using the following method:

The processor 130 runs the facial recognition module in the memory 140, and performs facial recognition on the profile image, to determine that the profile image is a face picture.

The processor 130 determines the face template based on the profile image.

During actual application, many contacts set pictures of the contacts as profile images. According to the foregoing method, the terminal device 100 can quickly determine the face template based on the profile image of the contact. The method is applicable to a scenario in which the user sets the profile image for the contact or the contact sets the profile image. In the method, the terminal device 100 can determine the face template by quickly obtaining the profile image of the contact and quickly determining, through facial recognition, whether the profile image is a face picture. Obviously, according to the method, the face template can be quickly and accurately determined, thereby improving efficiency and flexibility of determining the face template by the terminal device 100.

In the first to the fourth scenarios, the processor 130 may determine the face template based on a plurality of face pictures of the contact. Therefore, when determining the face template, the processor 130 may select a face picture having an obvious facial contour feature, relatively high resolution, and relatively desirable quality from the plurality of face pictures, to determine the face template. In this way, accuracy of the face template can be improved.

S503: The terminal device 100 generates contact information of the contact, where the contact information indicates contact information of the contact to which the face template belongs.

Optionally, the processor 130 generates the contact information.

Optionally, the processor 130 may generate the contact information based on identification information of the communications application and/or identification information of the contact. Optionally, when the terminal device can determine the communications application based on the identification information of the contact, the contact information includes the identification information of the contact.

Optionally, the contact information may further include identification information of the communications application and identification information of the contact.

S504: The terminal device 100 establishes a face information template based on the face template and the contact information, where the face information template indicates a correspondence between the face template and the contact information.

Optionally, that the processor 130 of the terminal device 100 may establish the face information template based on the face template and the contact information includes:

displaying, by the processor 130, a confirmation request in the display panel 161, where the confirmation request is used to inform the user of the terminal device 100 that the face template of the contact has been determined and request the user to confirm whether the face template is correct; and after receiving a confirmation response sent by the user by using the touch panel 131 or the another input device 152, establishing, by the processor 130, the face information template based on the face template and the contact information, where the confirmation response is used to notify the terminal device 100 that the user has confirmed that the face template is correct.

According to the foregoing method, the terminal device 100 establishes the face information template after obtaining a confirmation of the user, so as to ensure accuracy of the face information template.

According to the face information template establishment method provided in this embodiment of this application, the terminal device can quickly and accurately establish the face information template for the contact. In this way, when sharing a multimedia file, the terminal device can quickly send, to the contact by using the face information template, the multimedia file needing to be shared.

In addition, the terminal device may perform the foregoing face information template establishment method for each contact in each communications application installed in the terminal device, so as to establish a plurality of face information templates. In this way, when sharing a template source file, the terminal device can quickly determine a receiver of the to-be-shared template source file by using the plurality of established face information templates, thereby implementing quick sharing of the template source file.

Figure 6:
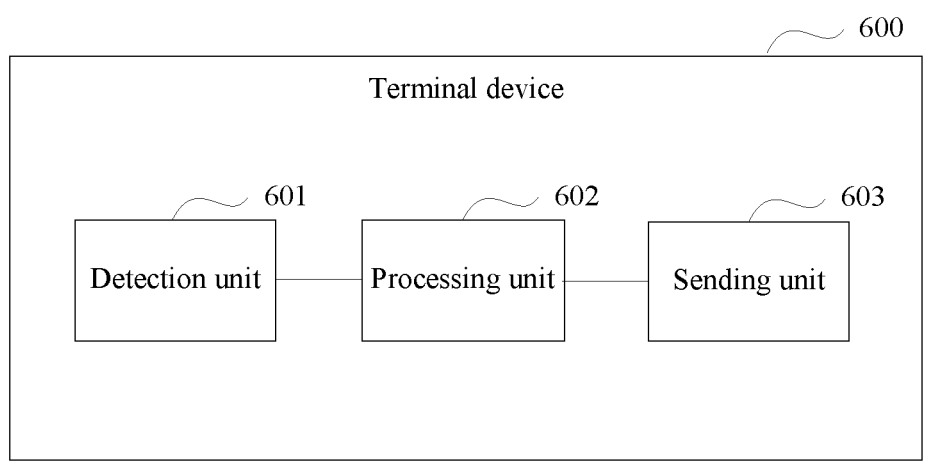
FIG. 6 is a structural diagram of a second terminal device according to an embodiment of this application.

Based on the foregoing embodiment, an embodiment of this application further provides a terminal device. The terminal device can implement the multimedia file sharing method shown in FIG. 2. Referring to FIG. 6, the terminal device 600 includes a detection unit 601, a processing unit 602, and a sending unit 603.

The detection unit 601 is configured to perform facial recognition on a displayed picture, to obtain a face picture in the picture.

The processing unit 602 is configured to determine that the face picture successfully matches a first face template included in a specified first face information template. The first face information template indicates a correspondence between the first face template and first contact information, and the first contact information indicates contact information of a first contact to which the first face template belongs.

The sending unit 603 is configured to send a multimedia file to the first contact based on the first contact information. The multimedia file is the picture, a picture set or a video file including the picture, or a picture or a video file generated based on the picture.

Optionally, the picture is a picture of a to-be-photographed scene that is displayed in a viewfinder frame in a process of photographing the to-be-photographed scene by the terminal device 600.

The processing unit 602 is further configured to: before the sending unit 603 sends the multimedia file, receive a photographing completion instruction, and generate the multimedia file for the to-be-photographed scene based on the picture.

Optionally, the picture is a picture displayed by the terminal device in a multimedia file editing and production process.

The processing unit 602 is further configured to: before the sending unit 603 sends the multimedia file, generate the multimedia file based on the picture in the multimedia file editing and production process.

Optionally, the first contact information includes identification information of the first contact.

The processing unit is 602 further configured to: before the sending unit 603 sends the multimedia file, determine a communications application based on the identification information of the first contact.

The sending unit 603 is specifically configured to send the multimedia file to the first contact based on the identification information of the first contact by using the communications application.

Alternatively, the first contact information includes identification information of a first communications application and identification information of the first contact.

The sending unit 603 is specifically configured to send the multimedia file to the first contact based on the identification information of the first contact by using a communications application corresponding to the identification information of the first communications application.

Optionally, the detection unit 601 is further configured to: after performing facial recognition on the picture, obtain at least one other face picture in the picture.

The processing unit 602 is further configured to: determine that one of the at least one other face picture successfully matches a second face template in a specified second face information template, where the second face information template identifies a correspondence between the second face template and second contact information, and the second contact information indicates contact information of a second contact to which the second face template belongs; and start or establish a communication group based on the first contact information and the second contact information, where the communication group includes the first contact and the second contact.

The sending unit 603 is specifically configured to send the multimedia file in the communication group.

Optionally, the first contact information includes identification information of a first communications application and identification information of the first contact, and the second contact information includes identification information of a second communications application and identification information of the second contact.

When starting or establishing the communication group based on the first contact information and the second contact information, the processing unit 602 is specifically configured to:

determine that the identification information of the first communications application in the first contact information is the same as the identification information of the second communications application in the second contact information; and start or establish the communication group based on the identification information of the first contact and the identification information of the second contact by using a communications application corresponding to the identification information of the first communications application.

This embodiment of this application provides a terminal device. The terminal device obtains the face picture in the currently displayed picture through facial recognition, and when determining that the first face template included in the first face information template successfully matches the face picture, sends, based on the first contact information in the first face information template, the multimedia file to the first contact to which the first face template belongs. The multimedia file is the picture, a picture set or a video file including the picture, or a picture or a video file generated based on the picture. In the foregoing multimedia file sharing process, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the foregoing multimedia file sharing process, a user does not need to perform complex operations, and the terminal device can quickly and accurately determine the receiver when sharing the multimedia file, so that the terminal device can implement quick sharing of the multimedia file, thereby improving user experience.

Figure 7:
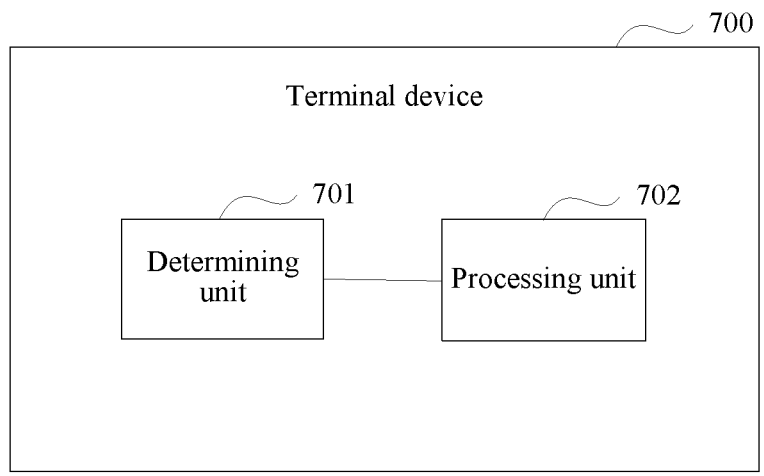
FIG. 7 is a structural diagram of a third terminal device according to an embodiment of this application.

Based on the foregoing embodiment, an embodiment of this application further provides a terminal device. The terminal device can implement the face information template establishment method shown in FIG. 5. Referring to FIG. 7, the terminal device 700 includes a determining unit 701 and a processing unit 702.

The determining unit 701 is configured to: obtain at least one template source file of a contact in a communications application, where the template source file is a picture or a video file; and determine a face template of the contact in the at least one template source file.

The processing unit 702 is configured to: generate contact information of the contact, where the contact information indicates contact information of the contact to which the face template belongs; and establish a face information template based on the face template and the contact information, where the face information template indicates a correspondence between the face template and the contact information.

Optionally, when obtaining the at least one template source file, the determining unit 701 is specifically configured to:

obtain a communication record between a user of the terminal device and the contact, and select the at least one template source file from the communication record.

When determining the face template of the contact in the at least one template source file, the determining unit 701 is specifically configured to:

obtain, from the communication record, communication information associated with each template source file, where communication content associated with any template source file satisfies that a difference between a location of the communication information and a location of the template source file falls within a specified location range, a difference between a sending time of the communication information and a sending time of the template source file falls within a specified time range, or the communication information is communication content that falls within a specified word count range before and after the template source file is sent;

perform semantic analysis on the communication information associated with each template source file, and determine whether a face picture of the contact exists in a picture included in each template source file;

determine a to-be-selected template source file in the at least one template source file, where the to-be-selected template source file is a template source file including a picture in which a face picture of the contact exists; and determine the face template based on the face picture of the contact that exists in the to-be-selected template source file.

Optionally, when obtaining the at least one template source file, the determining unit 701 is specifically configured to:

obtain a communication record between a user of the terminal device and the contact, and select the at least one template source file from the communication record.

When determining the face template of the contact in the at least one template source file, the determining unit 701 is specifically configured to:

determine all face pictures appearing in the at least one template source file; group all the determined face pictures by using a facial recognition technology, to obtain at least one face picture group, where all face pictures belonging to a same face picture group are recognized as being from a same person;

select, from the at least one face picture group, a target face picture group including a largest quantity of face pictures; and determine the face template based on the face pictures included in the target face picture group.

Optionally, when obtaining the at least one template source file, the determining unit 701 is specifically configured to:

obtain the at least one template source file stored for a video call between a user of the terminal device and the contact; or obtain, in a video calling process between the user and the contact, the at least one template source file in a video call displayed by the terminal device.

When determining the face template of the contact in the at least one template source file, the determining unit 701 is specifically configured to:

determine all face pictures appearing in the at least one template source file; group all the determined face pictures by using a facial recognition technology, to obtain at least one face picture group, where all face pictures belonging to a same face picture group are recognized as being from a same person; and when a quantity of the at least one face picture group is 1, determine the face template based on the face pictures included in the obtained face picture group; or when a quantity of the at least one face picture group is greater than or equal to 2, select a target face picture group from the at least one face picture group, where the target face picture group includes a largest quantity of face pictures, or a face picture included in the target face picture group does not match any other stored face template or a profile image of any other contact; and determine the face template based on the face picture included in the target face picture group.

Optionally, when obtaining the at least one template source file, the processing unit 702 is specifically configured to:

obtain at least one template source file published by the contact in a social network of the communications application.

When determining the face template of the contact in the at least one template source file, the processing unit 702 is specifically configured to:

obtain, from the social network, published information associated with each template source file, where published information associated with any template source file includes one or a combination of the following: information published by the contact when sending the template source file, and comment information published by another contact for the template source file;

perform semantic analysis on the published information associated with each template source file, and determine whether a face picture of the contact exists in each template source file;

determine a to-be-selected template source file in the at least one template source file, where the to-be-selected template source file is a template source file in which a face picture of the contact exists; and determine the face template based on the face picture of the contact that exists in the to-be-selected template source file.

Optionally, when obtaining the at least one template source file, the determining unit 701 is specifically configured to:

obtain a profile image published by the contact.

When determining the face template of the contact in the at least one template source file, the determining unit 701 is specifically configured to:

perform facial recognition on the profile image, to determine that the profile image is a face picture; and determine the face template based on the profile image.

Optionally, when establishing the face information template based on the face template and the contact information, the processing unit 702 is specifically configured to:

display a confirmation request, where the confirmation request is used to inform the user of the terminal device that the face template of the contact has been determined and request the user to confirm whether the face template is correct; and establish the face information template based on the face template and the contact information after receiving a confirmation response of the user, where the confirmation response is used to notify the terminal device that the user has confirmed that the face template is correct.

Optionally, the contact information includes identification information of the communications application and identification information of the contact; or the contact information includes identification information of the contact.

This embodiment of this application provides a terminal device. The terminal device can quickly and accurately establish the face information template for the contact. In this way, when sharing a multimedia file, the terminal device can quickly and accurately send, to the contact by using the face information template, the multimedia file needing to be shared.

It should be noted that module division in the embodiments of this application is an example and is merely logical function division. During actual implementation, there may be another division manner. The functional units in the embodiments of this application may be integrated into one processing unit, or each unit may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or a compact disc.

Figure 8:
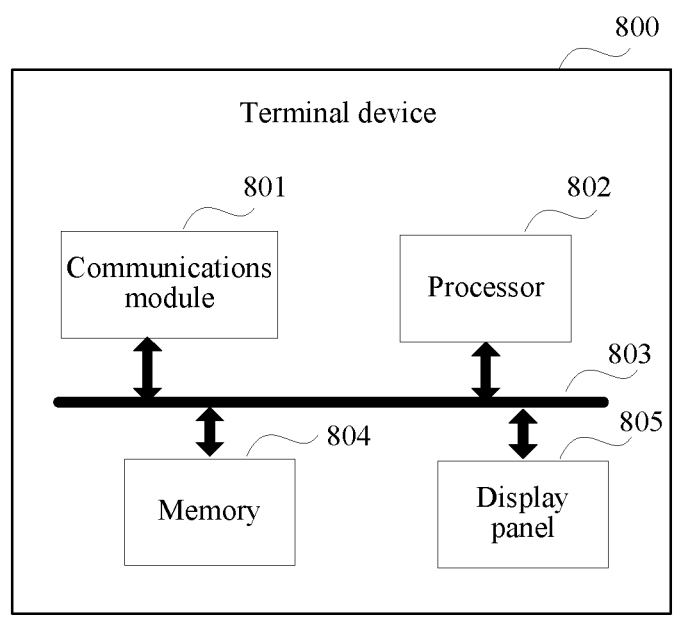
FIG. 8 is a structural diagram of a fourth terminal device according to an embodiment of this application.

Based on the foregoing embodiment, an embodiment of this application further provides a terminal device. The terminal device can implement the multimedia file sharing method shown in FIG. 2, and has functions of the terminal device 600 shown in FIG. 6. Referring to FIG. 8, the terminal device 800 includes a communications module 801, a processor 802, a bus 803, a memory 804, and a display panel 805.

The communications module 801, the processor 802, the memory 804, and the display panel 805 are connected to each other by using the bus 803. The bus 803 may be a peripheral component interconnect (peripheral component interconnect, PCI) bus, an extended industry standard architecture (extended industry standard architecture, EISA) bus, or the like. The bus may be classified into an address bus, a data bus, a control bus, or the like. For ease of representation, the bus in FIG. 8 is represented by using only one bold line, but this does not indicate that there is only one bus or only one type of bus.

The communications module 801 is configured to communicate and interact with another device. The communications module 801 may be an RF circuit, a WiFi module, a communications interface, a Bluetooth module, or the like.

The display panel 805 is configured to display various content, for example, a picture.

The processor 802 is configured to implement the multimedia file sharing method shown in FIG. 2, including:

performing facial recognition on a picture displayed in the display panel 805, to obtain a face picture in the picture;

determining that the face picture successfully matches a first face template included in a specified first face information template, where the first face information template indicates a correspondence between the first face template and first contact information, and the first contact information indicates contact information of a first contact to which the first face template belongs; and sending a multimedia file to the first contact based on the first contact information, where the multimedia file is the picture, a picture set or a video file including the picture, or a picture or a video file generated based on the picture.

The memory 804 is configured to store a program and the like. Specifically, the program may include program code, and the program code includes an instruction. The memory 804 may include a RAM, and may further include a non-volatile memory (non-volatile memory), for example, at least one magnetic disk memory. The processor 802 executes an application program stored in the memory 804 to implement the foregoing functions, so as to implement the multimedia file sharing method shown in FIG. 2.

This embodiment of this application provides a terminal device. The terminal device obtains the face picture in the currently displayed picture through facial recognition, and when determining that the first face template included in the first face information template successfully matches the face picture, sends, based on the first contact information in the first face information template, the multimedia file to the first contact to which the first face template belongs. The multimedia file is the picture, a picture set or a video file including the picture, or a picture or a video file generated based on the picture. In the foregoing multimedia file sharing process, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the foregoing multimedia file sharing process, a user does not need to perform complex operations, and the terminal device can quickly and accurately determine the receiver when sharing the multimedia file, so that the terminal device can implement quick sharing of the multimedia file, thereby improving user experience.

Figure 9:
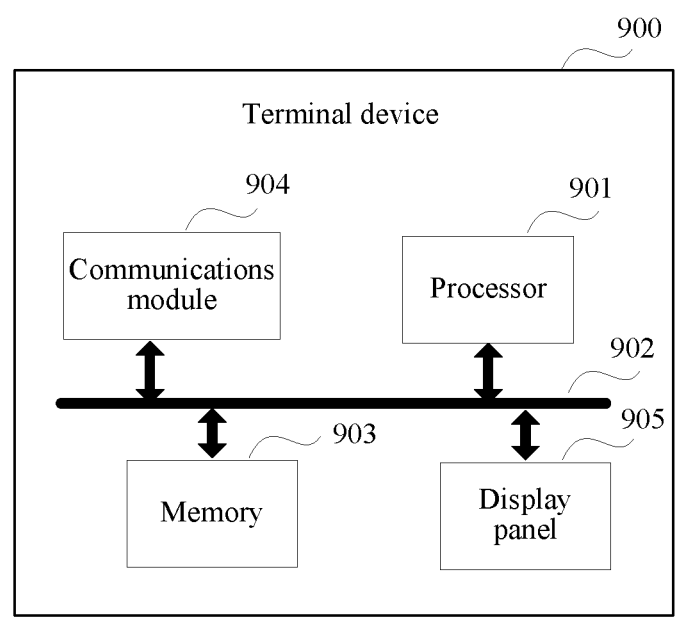
FIG. 9 is a structural diagram of a fifth terminal device according to an embodiment of this application.

Based on the foregoing embodiment, an embodiment of this application further provides a terminal device. The terminal device can implement the face information template establishment method shown in FIG. 5, and has functions of the terminal device 700 shown in FIG. 7. Referring to FIG. 9, the terminal device 900 includes a processor 901, a bus 902, and a memory 903.

The processor 901 and the memory 903 are connected to each other by using the bus 902. The bus 902 may be a PCI bus, an EISA bus, or the like. The bus may be classified into an address bus, a data bus, a control bus, or the like. For ease of representation, the bus in FIG. 9 is represented by using only one bold line, but this does not indicate that there is only one bus or only one type of bus.

Optionally, the terminal device 900 further includes a communications module 904, configured to communicate and interact with another device. The communications module 904 may be an RF circuit, a WiFi module, a communications interface, a Bluetooth module, or the like.

Optionally, the terminal device 900 further includes a display panel 905, configured to display various content, for example, a picture and a confirmation request.

The processor 901 is configured to implement the face information template establishment method shown in FIG. 5, including:

obtaining at least one template source file sent or published by a contact in a communications application, where the template source file is a picture or a video file;

determining a face template of the contact in the at least one multimedia file;

generating contact information of the contact, where the contact information indicates contact information of the contact to which the face template belongs; and establishing a face information template based on the face template and the contact information, where the face information template indicates a correspondence between the face template and the contact information.

The memory 903 is configured to store a program and the like. Specifically, the program may include program code, and the program code includes an instruction. The memory 903 may include a RAM, and may further include a non-volatile memory, for example, at least one magnetic disk memory. The processor 901 executes an application program stored in the memory 903 to implement the foregoing functions, so as to implement the face information template establishment method shown in FIG. 5.

This embodiment of this application provides a terminal device. The terminal device can accurately establish the face information template for the contact. In this way, when sharing a multimedia file, the terminal device can quickly and accurately send, to the contact by using the face information template, the multimedia file needing to be shared.

In conclusion, the embodiments of this application provide a multimedia file sharing method and a terminal device. In the method, the terminal device obtains the face picture in the currently displayed picture through facial recognition, and when determining that the first face template included in the first face information template successfully matches the face picture, sends, based on the first contact information in the first face information template, the multimedia file to the first contact to which the first face template belongs. The multimedia file is the picture, a picture set or a video file including the picture, or a picture or a video file generated based on the picture. According to the foregoing method, the terminal device can quickly and accurately determine an identity of a face in the face picture in the picture through facial recognition and matching between the face picture and the face template in the face information template, that is, determine a receiver when sharing the multimedia file. Therefore, contact information of the receiver can be determined, and the multimedia file can be quickly shared based on the contact information. Obviously, in the method, a user does not need to perform complex operations, and the terminal device can quickly and accurately determine the receiver when sharing the multimedia file, so that the terminal device can implement quick sharing of the multimedia file, thereby improving user experience.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this application without departing from the spirit and scope of the embodiments of this application. This application is intended to cover these modifications and variations to the embodiments of this application provided that they fall within the scope of protection defined by the following claims of this application and their equivalent technologies.

What is claimed is:

1. A multimedia file sharing method, performed by a terminal device, comprising:
obtaining at least one template source file of a first contact in a communications application installed on the terminal device, wherein the at least one template source file is from a communication record between a user of the terminal device and the first contact in the communications application, and the at least one template source file comprising a first picture or a video file;
determining a face template of the first contact based on the at least one template source file;
obtaining contact information of the first contact;
establishing a correspondence between the face template and the contact information of the first contact;
displaying a second picture;
performing recognition on the second picture to obtain a face picture in the second picture; and
when the face picture successfully matches the face template of the first contact, sending a multimedia file to the first contact according to the contact information of the first contact using a first communications application based on identification information of the first contact, the multimedia file comprising the second picture, a picture set comprising the second picture, a video file comprising the second picture, a picture generated based on the second picture or a video file generated based on the second picture.

2. The method of claim 1, wherein the contact information of the first contact comprises identification information of the first contact, and wherein sending the multimedia file to the first contact comprises:
determining the first communications application based on the identification information of the first contact; and
sending the multimedia file to the first contact according to the identification information of the first contact using the first communications application.

3. The method of claim 1, wherein the contact information of the first contact comprises a second communications application and identification information of the first contact, and wherein sending the multimedia file to the first contact comprises sending the multimedia file to the first contact according to the identification information of the first contact using the first second communications application.

4. The method of claim 1, further comprising:
obtaining another face picture in the second picture;
when the other face picture successfully matches a face template of a second contact,
starting or establishing a communication group comprising the first contact and the second contact in the first communications application; and
sending the multimedia file to the communication group.

5. The method of claim 1, further comprising:
obtaining a third picture and communication information associated with the third picture from the communication record, a sending time of the communication information associated with the third picture and a sending time of the third picture falling within a specified time range, or the communication information falling within a specified word count range before and after the third picture is sent;
performing semantic analysis on the communication information associated with the third picture to determine whether a face picture of the first contact exists in the third picture; and
determining that the third picture comprises one of the at least one template source file of the first contact when the face picture of the first contact exists in the third picture.

6. The method of claim 1, further comprising:
obtaining a first video file and communication information associated with the first video file from the communication record, a sending time of the communication information associated with the first video file and a sending time of the first video file falling within a specified time range, or the communication information falling within a specified word count range before and after the first video file is sent;

performing semantic analysis on the communication information associated with the first video file to determine whether a face picture of the first contact exists in the first video file; and determining that the first video file comprises one of the at least one template source file of the first contact when the face picture of the first contact exists in the first video file.

7. The method of claim 1, further comprising:

determining all face pictures in the communication record;

grouping all the face pictures using a facial recognition technology to obtain at least one face picture group, all face pictures belonging to a same face picture group being recognized as from a same person;

selecting a target face picture group comprising a largest quantity of face pictures from the at least one face picture group; and determining the at least one template source file of the first contact based on the target face picture group.

8. The method of claim 1, further comprising determining the at least one template source file of the first contact based on a picture file or a video file saved during a video call between the user of the terminal device and the first contact.

9. The method of claim 1, further comprising:

obtaining a fourth picture published by the first contact and comments from the first contact or another contact on the fourth picture published in a social network of the communications application;

performing semantic analysis on the comments to determine whether a face picture of the first contact exists in the fourth picture; and determining that the fourth picture comprises one of the at least one template source file of the first contact when the face picture of the first contact exists in the fourth picture.

10. The method of claim 1, further comprising:

obtaining a second video file published by the first contact and comments from the first contact or another contact on the second video file published in a social network of the communications application;

performing semantic analysis on the comments to determine whether a face picture of the first contact exists in the second video file; and determining that the second video file comprises one of the at least one template source file of the first contact when the face picture of the first contact exists in the second video file.

11. The method of claim 1, further comprising:

obtaining a profile image of the first contact;

performing facial recognition on the profile image to determine whether the profile image comprises a face picture; and determining that the profile image of the first contact comprises one of the at least one template source file of the first contact when the profile image comprises a face picture.

12. A terminal device, comprising:

a communications device;

a display panel coupled to the communications device;

a memory coupled to the communications device and the display panel and configured to store instructions; and a processor coupled to the communications device, the display panel and the memory, the instructions causing the processor to be configured to:

obtain at least one template source file of a first contact in a communications application installed on the terminal device, wherein the at least one template source file is from a communication record between a user of the terminal device and the first contact in the communications application, and the at least one template source file comprising a first picture or a video file;

determine a face template of the first contact based on the at least one template source file;

obtain contact information of the first contact;

establish a correspondence between the face template and the contact information of the first contact;

display a second picture using the display panel;

perform recognition on the second picture to obtain a face picture in the second picture; and when the face picture successfully matches the face template of the first contact, send a multimedia file to the first contact according to the contact information of the first contact using a first communications application based on identification information of the first contact, the multimedia file comprising the second picture, a picture set comprising the second picture, a video file comprising the second picture, a picture generated based on the second picture or a video file generated based on the second picture.

13. The terminal device of claim 12, wherein the contact information of the first contact comprises identification information of the first contact, and the instructions further causing the processor to be configured to:

determine a the first communications application based on the identification information of the first contact; and send the multimedia file to the first contact according to the identification information of the first contact using the first communications application.

14. The terminal device of claim 12, wherein the instructions further cause the processor to be configured to:

obtain another face picture in the second picture;

when the other face picture successfully matches a face template of a second contact, start or establish a communication group comprising the first contact and the second contact; and send the multimedia file to the communication group.

15. The terminal device of claim 12, wherein the instructions further cause the processor to be configured to:

obtain a third picture and communication information associated with the third picture from the communication record, a sending time of the communication information associated with the third picture and a sending time of the third picture falling within a specified time range, or the communication information falling within a specified word count range before and after the third picture is sent;

perform semantic analysis on the communication information associated with the third picture to determine whether a face picture of the first contact exists in third picture; and determine that the third picture comprises one of the at least one template source file of the first contact when the face picture of the first contact exists in the third picture.

16. The terminal device of claim 12, wherein the instructions further cause the processor to be configured to:

obtain a first video file and communication information associated with the first video file from the communication record, a sending time of the communication information associated with the first video file and a sending time of the first video file falling within a specified time range, or the communication information falling within a specified word count range before and after the first video file is sent;

perform semantic analysis on the communication information associated with the first video file to determine whether a face picture of the first contact exists in first video file; and determine that the first video file comprises one of the at least one template source file of the first contact when the face picture of the first contact exists in the first video file.

17. The terminal device of claim 12, wherein the instructions further cause the processor to be configured to:

determine all face pictures in the communication record;

group all the face pictures using a facial recognition technology to obtain at least one face picture group, all face pictures belonging to a same face picture group being recognized as from a same person;

select a target face picture group comprising a largest quantity of face pictures from the at least one face picture group; and determine the at least one template source file of the first contact based on the target face picture group.

18. The terminal device of claim 12, wherein the instructions further cause the processor to be configured to determine the at least one template source file of the first contact based on a picture file or a video file saved during a video call between the user of the terminal device and the first contact.

19. The terminal device of claim 12, wherein the instructions further cause the processor to be configured to:

obtain a fourth picture published by the first contact and comments from the first contact or another contact on the fourth picture published in a social network of the communications application;

perform semantic analysis on the comments to determine whether a face picture of the first contact exists in the fourth picture; and determine that the fourth picture comprises one of the at least one template source file of the first contact when a face picture of the first contact exists in fourth picture.

20. The terminal device of ato flclaim 12, wherein the instructions further cause the processor to be configured to:

obtain a second video file published by the first contact and comments from the first contact or another contact on the second video file published in a social network of the communications application;

perform semantic analysis on the comments to determine whether a face picture of the first contact exists in the second video file; and determine that the second video file comprises one of the at least one template source file of the first contact when the face picture of the first contact exists in the second video file.

* * * * *